(12) United States Patent
Fukuda et al.

(10) Patent No.: US 7,658,109 B2
(45) Date of Patent: Feb. 9, 2010

(54) INERTIAL SENSOR AND MANUFACTURING METHOD OF THE SAME

(75) Inventors: Hiroshi Fukuda, London (GB); Yuko Hanaoka, Kodaira (JP); Tsukasa Fujimori, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 35 days.

(21) Appl. No.: 11/764,096

(22) Filed: Jun. 15, 2007

(65) Prior Publication Data

US 2008/0196502 A1    Aug. 21, 2008

(30) Foreign Application Priority Data

Jun. 30, 2006    (JP) .............................. 2006-181056

(51) Int. Cl.
*G01P 15/125* (2006.01)
(52) U.S. Cl. ................................ 73/514.32; 73/514.38
(58) Field of Classification Search .............. 73/514.32, 73/514.29, 514.16, 514.36, 514.38, 504.15, 73/510, 511
See application file for complete search history.

(56) References Cited

U.S. PATENT DOCUMENTS

| 5,526,688 | A | * | 6/1996 | Boysel et al. ............ 73/514.38 |
| 5,760,455 | A | | 6/1998 | Hierold et al. |
| 6,122,965 | A | * | 9/2000 | Seidel et al. ............. 73/514.36 |
| 6,159,761 | A | * | 12/2000 | Okada ......................... 438/53 |
| 6,230,564 | B1 | * | 5/2001 | Matsunaga et al. ....... 73/514.01 |
| 6,262,946 | B1 | | 7/2001 | Khuri-Yakub et al. |
| 6,705,167 | B2 | | 3/2004 | Kvisteroey et al. |
| 7,458,263 | B2 | * | 12/2008 | Nasiri et al. ............. 73/504.12 |

FOREIGN PATENT DOCUMENTS

JP    2005-69946 A    3/2005

OTHER PUBLICATIONS

S. Lewis et al., "Integrated Sensor and Electronics Processing for >10⁸ 'iMEMS' Inertial Measurement Unit Components," Technical Digest of IEEE Electron Devices Meeting, 2003, pp. 39.1.1-39.1.4.

* cited by examiner

*Primary Examiner*—Helen C. Kwok
(74) *Attorney, Agent, or Firm*—Miles & Stockbridge P.C.

(57) ABSTRACT

A weight of an inertial sensor if formed from a plurality of divided weights, and the divided weights are connected to each other by elastically deformable beams. A movable range and a mass of each of the divided weights and a rigidity of each of the beams are adjusted and a plurality of deformation modes having different sensitivity ranges with respect to the acceleration are used in combination. By this means, it is possible to improve a detecting sensitivity of an acceleration and widen an acceleration response range.

18 Claims, 20 Drawing Sheets

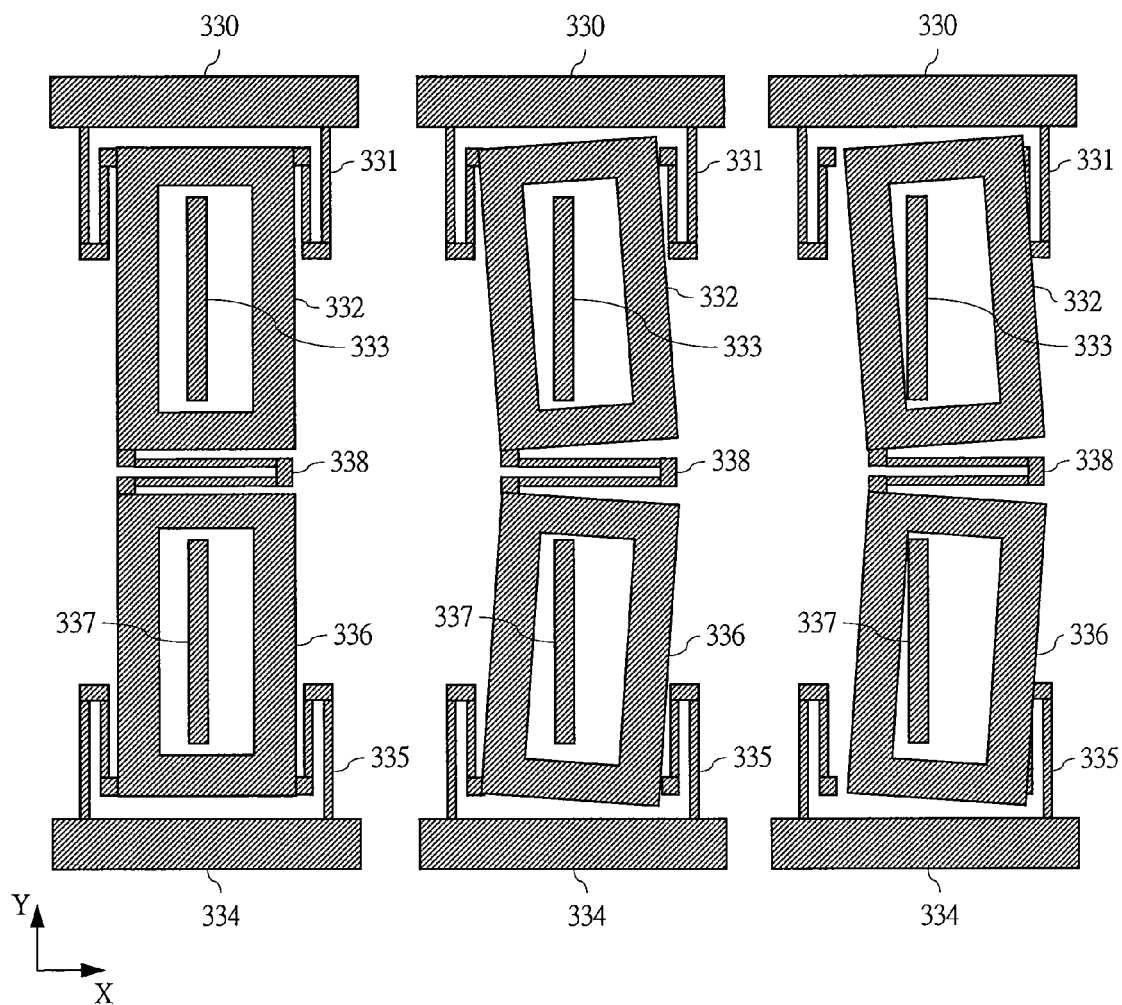

INERTIAL SENSOR AND MANUFACTURING METHOD OF THE SAME

CROSS-REFERENCE TO RELATED APPLICATION

The present application claims priority from Japanese Patent Application No. JP2006-181056 filed on Jun. 30, 2006, the content of which is hereby incorporated by reference into this application.

TECHNICAL FIELD OF THE INVENTION

The present invention relates to an inertial sensor by micro electro mechanical systems (MEMS) and a manufacturing technology of the same. More particularly, it relates to an integrated device of a semiconductor integrated circuit device and an inertial sensor and a manufacturing technology of the same.

BACKGROUND OF THE INVENTION

There has been developed a micro electro mechanical systems (MEMS) technology for forming a mechanical sensor such as a pressure sensor or an acceleration sensor, a miniaturized mechanical part such as a minute switch or a transducer, and a mechanical system, by using a micro-fabrication technology for forming a semiconductor integrated circuit device. The MEMS is broadly classified into a bulk MEMS that is formed by processing a silicon substrate itself to form micro components and a surface MEMS that is formed by repeating the deposition and patterning of thin films on a silicon substrate surface to form micro components.

As an acceleration sensor by the bulk MEMS, for example, there has been developed an element in which a weight formed by a handling layer and others of a silicon substrate or an SOI substrate is supported by a beam formed by an active layer, and a deformation of the beam due to the acceleration is detected on the basis of a piezo effect (refer to Japanese Patent Application Laid-Open Publication No. 2005-69946 (Patent Document 1) or U.S. Pat. No. 6,705,167B2 (Patent Document 2)).

As an acceleration sensor by the surface MEMS, for example, there has been developed an acceleration sensor in which a weight and a beam are formed by a polysilicon film having a thickness of about 2 μm to 4 μm, and a movement of the weight due to the acceleration is detected on the basis of a capacitance change between electrodes formed in both the weight and an outer frame (refer to Technical digest of IEEE electron devices meeting (2003) pp. 39.1.1 to 39.1.4 (Non-patent document 1)).

In these MEMS sensors, a mechanical deformation of a structure body due to an external force is converted into an electric signal as a piezo resistance change or a capacitance change, and in general, an output thereof is signal-processed by a semiconductor integrated circuit device (LSI: Large Scale Integration). As mentioned above, since the MEMS is utilized in combination with the LSI and the MEMS itself is manufactured by using a semiconductor manufacturing technology, there has been developed a technology for integrating both the elements on the same substrate in a monolithic manner.

For example, an acceleration sensor and a vibratory gyroscope using the weight made of a polysilicon film are integrated with an analogue circuit such as a capacitance-voltage conversion circuit and an operational amplifier. A sensor mechanism portion (arranged on the silicon substrate via a partial air gap) and the analogue circuit portion are arranged in different (adjacent) regions on a substrate surface. The sensor mechanism portion is sealed in a cavity which is wholly covered by a cover. For example, U.S. Pat. No. 5,760,455 (Patent Document 3) or U.S. Pat. No. 6,262,946B1 (Patent Document 4) has a description about a method of arranging pillar-like supports in the cavity portion.

SUMMARY OF THE INVENTION

A problem to be solved by the present invention is that, first, it becomes hard to achieve both a strength (reliability) of the structure body and a sensitivity of the inertial sensor when the inertial sensor by the MEMS of the prior art is miniaturized. In other words, in the inertial sensor by the MEMS, the sensitivity is improved by weakening the strength of a beam (spring) supporting the weight (reducing a spring constant of the beam) in general. However, in this case, if the inertial sensor itself is miniaturized or thinned, the strength of the beam is significantly lowered. In other words, since it is necessary to weaken the strength of the beam supporting the weight for improving the sensitivity of the inertial sensor, it becomes hard to simultaneously secure the strength and the sensitivity of the inertial sensor.

Further, in the inertial (acceleration) sensor, it is necessary to measure a wide acceleration range from a small acceleration to a large acceleration at a high accuracy (secure a dynamic range). However, it is hard to secure the dynamic range in the prior art. In other words, if the spring constant is made smaller for achieving the high sensitivity with respect to the small acceleration, the weight is significantly displaced when the large force is applied, and it exceeds a movable range thereof or a substantial sensitivity cannot be obtained due to a saturation characteristic of the spring. On the other hand, if the spring constant is increased for measuring the large force, the sensitivity with respect to the small force cannot be obtained. Accordingly, there is a problem that the independent acceleration sensors are necessary in accordance with the supposed acceleration ranges.

Second, in the inertial (acceleration) sensor by the bulk MEMS or the surface MEMS, there is a problem that it is necessary to employ a special sealing and mounting technology such as a wafer lamination which is different from the normal LSI manufacturing technology. Further, the problem also exists in a point that it is hard to mount the inertial sensor together with the LSI or the different type of sensor in a monolithic manner.

The first object of the present invention is to provide an inertial (acceleration) sensor by the MEMS, which can achieve both a strength (reliability) of a structure body and a sensitivity of the inertial sensor and can obtain a fixed-level sensitivity in a wide acceleration range (have a wide dynamic range), even in the case where the inertial sensor by the MEMS is miniaturized.

The second object thereof is to provide an inertial (acceleration) sensor and a manufacturing method of the same, in which the sensor can be miniaturized and can be mounted together with a semiconductor integrated circuit device or a different type of sensor by the MEMS in a monolithic manner, by sealing and mounting the inertial sensor in a manufacturing process of a complementary metal oxide semiconductor (CMOS) according to a standard LSI manufacturing technology.

The above and other objects and novel characteristics of the present invention will be apparent from the description of this specification and the accompanying drawings.

The typical ones of the inventions disclosed in this application will be briefly described as follows.

An inertial sensor according to the present invention comprises: (a) a cavity portion formed on a substrate; (b) a weight suspended in the cavity portion via an elastically deformable elastic body; and (c) a fixed electrode provided in the cavity portion, wherein a position change of the weight due to an acceleration is detected on the basis of a change of an electrostatic capacitance between the weight and the fixed electrode, and the weight is divided into a plurality of divided weights, and each of the plurality of divided weights is connected to each other by elastically deformable elastic bodies.

Further, a manufacturing method of an inertial sensor according to the present invention comprises: (a) a step of forming a fixed electrode on a semiconductor substrate; (b) a step of forming a first interlayer insulating film on the fixed electrode; (c) a step of forming a first thin film on the first interlayer insulating film; (d) a step of patterning the first thin film to form a plurality of divided weights functioning as a movable electrode and a plurality of elastic bodies which connect the plurality of divided weights; (e) a step of forming a second interlayer insulating film on the patterned first thin film; (f) a step of forming a second thin film on the second interlayer insulating film; (g) a step of patterning the second thin film to form first etching holes in the second thin film; and (h) a step of forming a cavity portion by etching a part of the first interlayer insulating film and a part of the second interlayer insulating film through the first etching holes, so that the plurality of divided weights are suspended in the formed cavity portion via the plurality of elastic bodies.

Further, a manufacturing method of an inertial sensor according to the present invention comprises: (a) a step of forming a fixed electrode on a semiconductor substrate; (b) a step of forming a first interlayer insulating film on the fixed electrode; (c) a step of forming a first thin film on the first interlayer insulating film; (d) a step of patterning the first thin film to form a weight functioning as a movable electrode and a plurality of elastic bodies connected to the weight; (e) a step of forming a second interlayer insulating film on the patterned first thin film; (f) a step of forming a second thin film on the second interlayer insulating film; (g) a step of patterning the second thin film to form etching holes in the second thin film existing on a forming region of the weight and the plurality of elastic bodies and not to form the etching hole in the second thin film existing on regions other than the forming region of the weight and the plurality of elastic bodies; and (h) a step of forming a cavity portion by etching a part of the first interlayer insulating film and a part of the second interlayer insulating film through the first etching holes, so that the weight is suspended in the formed cavity portion via the plurality of elastic bodies, and a support portion which supports the cavity portion is formed by leaving a part of the first interlayer insulating film and a part of the second interlayer insulating film below a region of the second thin film in which the etching hole is not formed.

The effects obtained by typical aspects of the present invention will be briefly described below.

In the inertial sensor according to the present invention, it is possible to achieve both the strength (reliability) of the structure body and the sensitivity of the sensor, even in the case where the inertial sensor is miniaturized. Further, it is possible to achieve the sensitivity with respect to the small force and the non-saturation characteristic to the large force, and the fixed-level sensitivity can be obtained in the wide acceleration range. Also, it is possible to seal and package the movable structure body having the comparatively large area in the cavity having the large area in the standard CMOS process. Accordingly, it is possible to mount the inertial sensor together with the LSI or the different type of sensor in the monolithic manner. In particular, since it is possible to form the mechanism portion of the inertial sensor simultaneously with the wiring of the LSI, the integration with the LSI can be facilitated. Further, since the mechanism portion of the inertial sensor can be formed on an upper part of the LSI circuit region, the chip size can be reduced. Further, it is possible to mount the inertial sensor by the MEMS by completely the same mounting technology as a normal LSI such as a plastic package. Therefore, it is possible to achieve the size reduction, the performance improvement, and the cost reduction of the inertial sensor.

BRIEF DESCRIPTIONS OF THE DRAWINGS

FIG. 25A is a plan view showing a modified example of the planar layout of the movable structure body in the inertial sensor according to the third embodiment;

FIG. 25B is a plan view for explaining an operation of the inertial sensor in FIG. 25A; and FIG. 25C is a plan view for explaining an operation of the inertial sensor in FIG. 25A.

DESCRIPTIONS OF THE PREFERRED EMBODIMENTS

Figure 1:
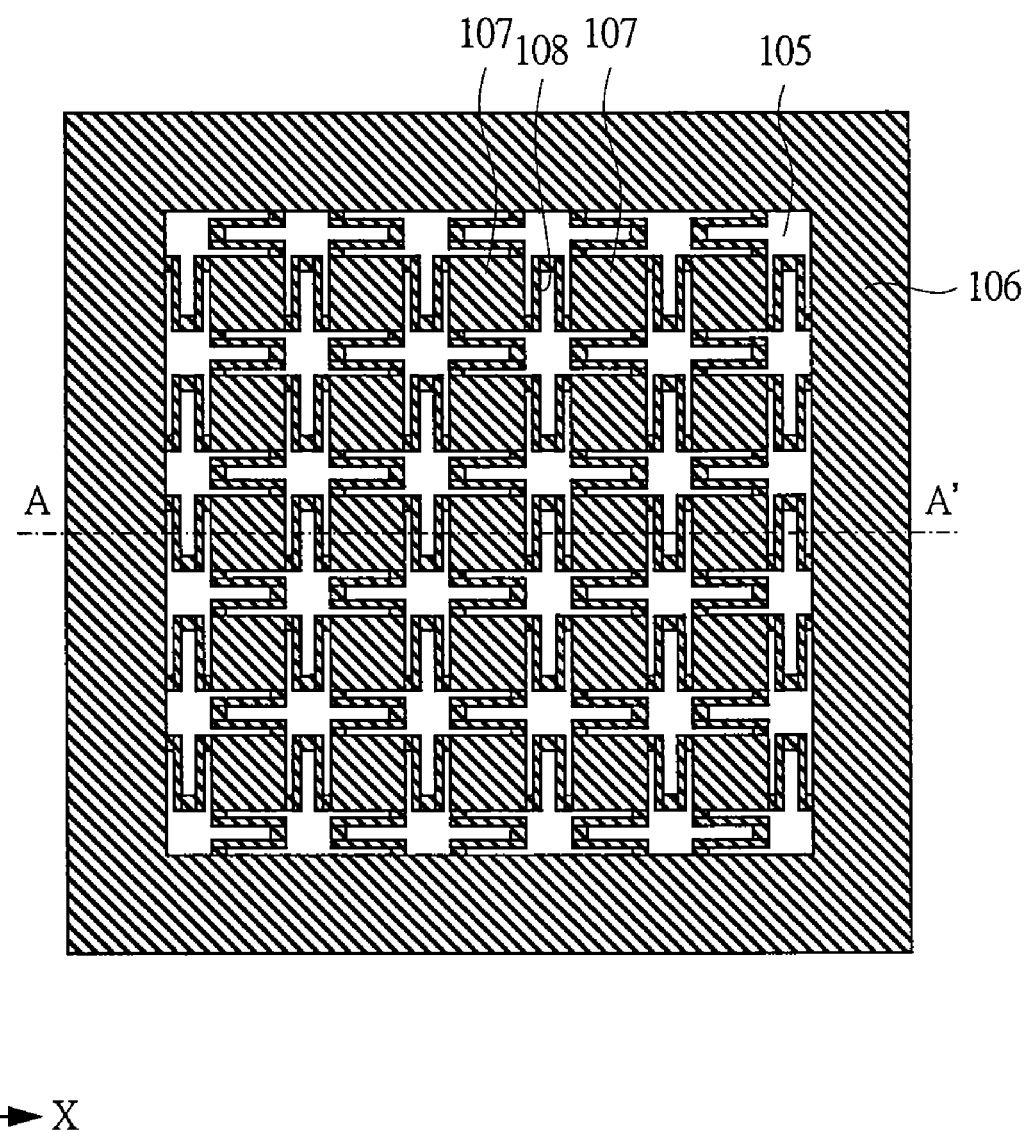
FIG. 1 is a plan view showing a planar layout of a movable structure body in an inertial sensor according to a first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above.

Also, components having the same function are denoted by the same reference symbols throughout the drawings for describing the embodiments, and the repetitive description thereof is omitted. Also, in the drawings used in the embodiments, hatching is used in some cases even in a plan view so as to make the drawings easy to see.

First Embodiment

An inertial sensor according to the first embodiment will be described with reference to the accompanying drawings. FIG. 1 is a plan view showing a mechanism portion (main portion) of an inertial sensor according to the first embodiment. As shown in FIG. 1, a frame 106 formed by a thin film is formed in the periphery. The frame 106 is fixed to a semiconductor substrate in which the inertial sensor is formed. A cavity portion 105 is formed inside the frame 106, and a plurality of divided weights 107 are arranged inside the cavity portion 105 via a plurality of beams (elastic bodies) 108. In other words, a plurality of divided weights 107 are arranged inside the cavity portion 105 in a two-dimensional manner (in a direction of an X axis and a direction of a Y axis), and the divided weights 107 are connected to each other by an elastically deformable beams 108. The plurality of divided weights 107 formed in the above-mentioned manner are designed to be displaced in a direction of a Z axis. In other words, when an acceleration is applied in the direction of the Z axis, the divided weights 107 displace in the direction of the Z axis. One of features of the present invention lies in that a plurality of divided weights 107 are arranged inside the cavity portion 105 via a plurality of beams 108. Accordingly, even in the case where the inertial sensor is miniaturized, it is possible to achieve both the strength (reliability) of the structure body and the sensitivity of the inertial sensor, and it is possible to obtain a fixed-level sensitivity in a wide acceleration range. Also, although the structure is configured such that a plurality of divided weights 107 are arranged inside the cavity portion 105 in the two-dimensional manner (in the direction of the X axis and the direction of the Y axis), the structure may be configured such that a plurality of divided weights 107 are arranged inside the cavity portion 105 in a one-dimensional manner.

Figure 2:
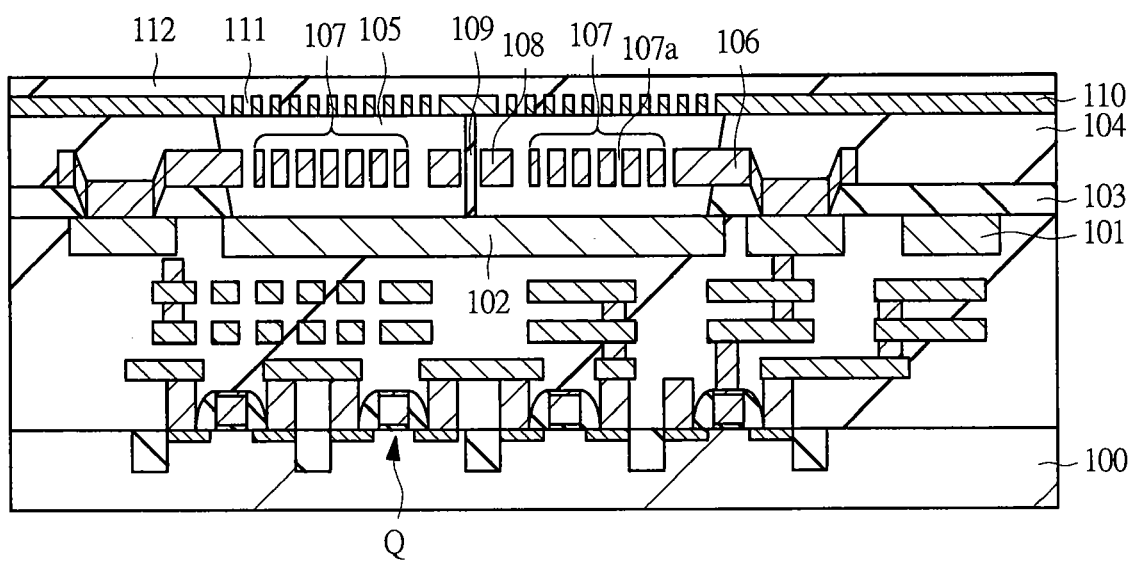
FIG. 2 is a cross sectional view showing a cross section taken along a line A-A' in FIG. 1.

FIG. 2 is a cross sectional view schematically showing a cross section taken along the line A-A' in FIG. 1. Although five divided weights 107 are arranged in the direction of the X axis in FIG. 1, it is supposed in FIG. 2 that some divided weights 107 are omitted and two divided weights 107 are formed in the direction of the X axis. In FIG. 2, for example, a plurality of metal insulator semiconductor field effect transistors (MISFET) Q are formed in a semiconductor substrate 100 made of single crystal silicon. The plurality of MISFETs Q function as, for example, a semiconductor integrated circuit device which processes a signal outputted from the inertial sensor. Further, multilayer wirings constituting the semiconductor integrated circuit are formed on the MISFETs Q. For example, in FIG. 2, four layers of the wirings are formed, and the multilayer wirings are electrically connected via plugs. As mentioned above, the semiconductor integrated circuit device including the MISFETs Q and the multilayer wirings is formed on the semiconductor substrate 100. In the first embodiment, the inertial sensor is formed on the semiconductor integrated circuit device formed on the semiconductor substrate 100. In other words, in the first embodiment, the semiconductor integrated circuit and the inertial sensor are formed in the monolithic manner.

Next, a structure of the inertial sensor will be described. A fixed electrode 102 constituting the mechanism portion of the inertial sensor is formed in the same layer as the wiring 101 formed in the fourth layer. The fixed electrode 102 is formed simultaneously in a step of forming the wiring 101. Further, an interlayer insulating film (first interlayer insulating film) 103 is formed on the fourth wiring layer in which the wiring 101 and the fixed electrode 102 are formed, and an interlayer insulating film (second interlayer insulating film) 104 is formed on the interlayer insulating film 103. A cavity portion 105 is provided in the interlayer insulating film 103 and the interlayer insulating film 104. A frame 106 fixed to the interlayer insulating film 104 is formed in the cavity portion 105, and the divided weight 107 is suspended to an inner side of the frame 106 via a beam (not shown in FIG. 2 and refer to FIG. 1). For example, as shown in FIG. 2, the frame 106 is formed in both ends of the cavity portion 105, and the divided weights 107 are suspended into the cavity portion 105 from each of both ends of the cavity portion 105. The two divided weights 107 suspended in the cavity portion 105 are connected to each other by the beam 108. Further, a support portion 109 is formed between the two divided weights 107. The support portion 109 is formed so as not to come into contact with the beam 108 and is structured so as not to hinder the elastic deformation of the beam 108. Further, etching holes (second etching hole) 107a penetrating through the divided weight 107 are formed in the divided weight 107. The etching hole 107a is provided for the purpose that a portion below the divided weight 107 can be sufficiently etched at a time when the cavity portion 105 is formed through an etching process as described later.

A second thin film 110 formed by a thin film is disposed on the interlayer insulating film 104 in which the cavity portion 105 is formed. The second thin film 110 is provided for sealing the cavity portion 105. Also, the second thin film 110 has a function as a fixed electrode in some cases. Etching holes (first etching hole) 111 are provided in the second thin film 110. The etching hole 111 is provided for forming the cavity portion 105 in the interlayer insulating film 103 and the interlayer insulating film 104 through the etching process after forming the second thin film 110 on the interlayer insulating film 104. The etching hole 111 formed in the second thin film 110 is sealed, for example, by a silicon oxide film 112.

Figure 3:
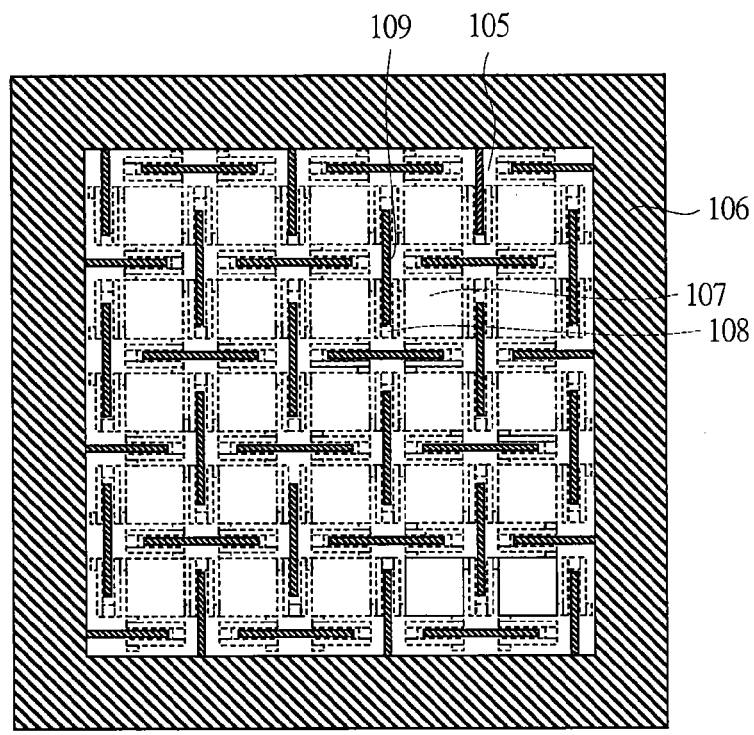
FIG. 3 is a plan view showing a planar layout of a support portion arranged in a cavity portion in the inertial sensor according to the first embodiment.

Next, FIG. 3 is a plan view showing a forming pattern of the support portion 109 which supports the second thin film 110 provided on the cavity portion 105. As shown in FIG. 3, the cavity portion 105 is formed inside the frame 106, and a plurality of divided weights 107 are suspended via the beams 108 in the cavity portion 105. The support portion 109 is formed among the plurality of divided weights 107. It can be understood that the plurality of support portions 109 are formed in a region where the beam 108 and the divided weight 107 are not formed inside the cavity portion 105. In FIG. 3, a plurality of slit-shaped support portions 109 are formed. One of the features of the present invention lies in that a plurality of support portions 109 are provided in the cavity portion 105. By suspending the divided weights 107 to the cavity portion 105 via the beams 108 and providing a plurality of support portions 109 in the cavity portion 105 as mentioned above, it is possible to reinforce the strength of the lid which seals the cavity portion 105. Particularly, in the case where a size of the cavity portion 105 is enlarged so as to suspend a large number of divided weights 107, it is possible to sufficiently reinforce the strength of the lid by providing the support portions 109. Accordingly, it is possible to improve the reliability of the inertial sensor.

Figure 4:
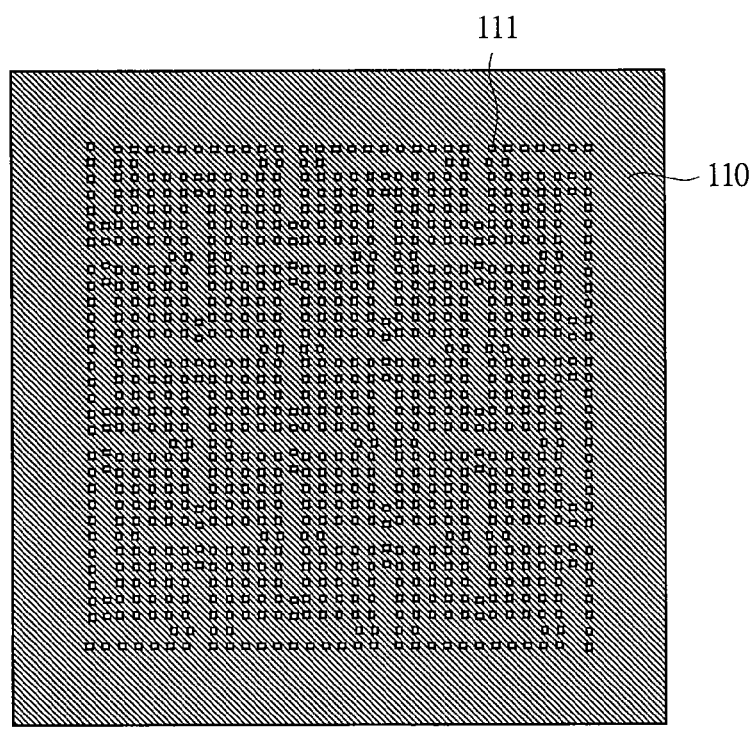
FIG. 4 is a plan view showing a layout pattern of etching holes provided in a lid which covers the cavity portion in the inertial sensor according to the first embodiment.

The support portion 109 can be formed by, for example, leaving a part of the interlayer insulating film to be etched at the time of etching for forming the cavity portion 105. FIG. 4 shows a forming pattern of the etching hole 111 formed in the second thin film 110 for forming the support portions 109 as mentioned above. As shown in FIG. 3 and FIG. 4, etching holes 111 formed in the second thin film 110 are not uniformly formed in the second thin film 110, but are formed non-uniformly. Specifically, the etching holes 111 are formed in a region of the second thin film 110 positioned on a region where the beams 108 and the divided weights 107 are formed, and the etching holes 111 are not formed in a region of the second thin film 110 positioned on a region where the beams 108 and the divided weights 107 are not formed. By arranging the etching holes 111 as mentioned above, the interlayer insulating film existing below the etching holes 111 is sufficiently etched, and the interlayer insulating film existing below the region where the etching hole 111 does not exist is left at the time of etching. Accordingly, the cavity portion 105 is sufficiently formed and thus the divided weights 107 are suspended in the region where the beams 108 and the divided weights 107 are formed, and the formation of the cavity portion 105 is suppressed and thus the support portions 109 can be formed in the region where the beams 108 and the divided weights 107 are not formed.

In the inertial sensor in the first embodiment, the movable structure body constituted by the beams 108 and the divided weights 107 is formed inside the cavity portion 105 and is fixed as the frame 106 to the interlayer insulating film which surrounds the cavity portion 105 by the elastically deformable LSI material or the metal wiring. The movable structure body is designed so that the mechanical characteristic thereof is determined by the dimensions of the movable structure body itself and the movable structure body does not depend on a shape of the cavity portion 105. Specifically, by providing (1) the portion (frame 106) fixed to the interlayer insulating film existing around the cavity portion 105 and having a size considered not to be elastically deformed substantially, (2) the movable portion (divided weight 107), and (3) the elastically deformable portion (beam 108) which connects the portions (1) and (2) and is elastically deformable, the dimensional accuracy of the cavity portion 105 hardly affects the mechanical characteristic of the inertial sensor. The dimensional accuracy of the movable structure body is defined on the basis of a formation accuracy of the normal wiring pattern of the LSI. Since the accuracy is significantly higher than a process accuracy of the conventional bulk MEMS or the like in general, the highly accurate mechanical characteristic is secured.

Since the movable structure body is formed by using the wiring layer, the movable structure body has both the mechanical function as a weight and the electric function as the electrode, the wiring and others by itself. In other words, in the inertial sensor in the first embodiment, a sensing is executed between the fixed electrode and the divided weight which are fixed to the interlayer insulating film as mentioned below and are electrically independent. The mechanical connection (beam) and the electric connection (wiring, detecting capacitor and others) between the movable structure body and its surroundings may be made by the different layers respectively constituting the semiconductor integrated circuit device.

Next, the characteristic structure of the present invention will be described further in detail. One of the features of the present invention lies in that the weight is divided into a plurality of divided weights, and the divided weights are connected to each other by elastically deformable beams. By connecting the divided weights by the elastically deformable beams, the following two effects can be mainly achieved. First, owing to a parallel arrangement effect of the inertial sensors having different spring constants and masses, it is possible to achieve both the sensitivity to a small acceleration and the non-saturation characteristic to a large acceleration. Secondly, the sensitivity is amplified by an inclination (angle effect) of the weight itself. Alternatively, it is possible to use a plurality of deformation modes having the different sensitivity regions to the acceleration in combination. Each of the matters mentioned above will be described below.

Figure 5A:
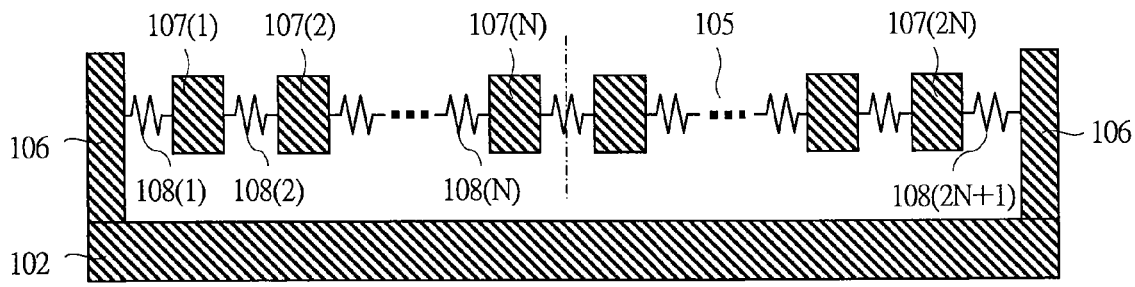
FIG. 5A is a schematic diagram for explaining a principle of the present invention.
Figure 5B:
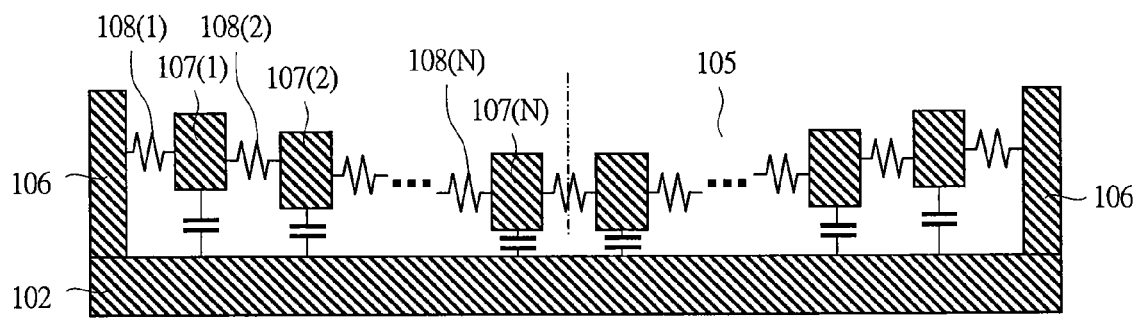
FIG. 5B is a schematic diagram for explaining a principle of the present invention.

As shown in FIG. 5A, a system in which 2N number of divided weights 107(1) to 107(2N) are connected to each other in series by the beams (springs) 108(1) to 108(2N+1) and are fixed to the substrate (frame 106) in both ends is assumed. The displacement of each of the divided weights 107(1) to 107(2N) when the acceleration having the same direction and absolute value is applied to each of the divided weights 107(1) to 107(2N) will be examined. When the acceleration a is applied in an upward direction of a paper surface, each of the divided weights 107(1) to 107(2N) relatively displaces as shown in FIG. 5B with respect to the substrate. In other words, the displacement of the divided weight 107(1) is relatively small, and the displacement becomes relatively larger from the divided weight 107(2) to the divided weight 107(N). Further, the displacement becomes relatively smaller from the divided weight 107(N) to the divided weight (2N). More specifically, the displacement is smaller in the divided weight closer to the fixed frame 106, and the displacement is larger in the divided weight away from the frame 106. The displacement is detected as an electrostatic capacitance change between the fixed electrode 102 arranged below (and/or above) the divided weights 107(1) to 107(2N) and the divided weights 107(1) to 107(2N). Normally, all the divided weights 107(1) to 107(2N) function as one electrically connected electrode. However, they are assumed as a parallel connection for the electrostatic capacitances between each of the divided weights 107(1) to 107(2N) and the fixed electrode 102. The detected electrostatic capacitance is equal to a total of the parallelly connected electrostatic capacitances.

On the assumption that the system is centrosymmetric, only one half of the system is considered. First, an elastic deformation in an expansion and contraction mode of the beams 108(1) and 108(N) will be examined (refer to FIG. 5C). The displacement X1 of the outermost divided weight 107(1) (fixed to the frame 106 by the first beam 108(1)) is equal to the deforming amount $\delta 1$ of the outermost beam 108(1). $\delta 1$ can be expressed by the expression $\delta 1 = (m1+m2+\ldots+mN)/k1\cdot a$ by using the total mass $(m1+m2+\ldots+mN)$ of the divided weights 107(1) to 107(N) and the spring constant (rigidity) k1 of the beams 108(1) to 108(N). At this time, the displacement Xj of the j-th divided weight 107(j) is equal to a total $\delta 1+\delta 2+\ldots \delta j$ of the displacements $\delta 1, \delta 2, \ldots, \delta j$ of the respective beams from the outermost beam to the j-th beam. In an electrostatic capacitance Cj between the j-th divided weight 107(j) and the fixed electrode 102, a change $\Delta Cj$ caused by the displacement Xj of the j-th divided weight 107(j) is expressed by the expression $\Delta Cj = \epsilon Sj \cdot Xj/d^2$ on the assumption that Xj is sufficiently smaller than a gap d between the divided weight 107(j) and the fixed electrode 102 in the case where the displacement does not exist for simplification, and the change $\Delta Cj$ is approximately in proportion to Xj. In this case, the reference symbol Sj denotes an area of the capacitance between the j-th divided weight 107(j) and the fixed electrode 102.

Figure 5C:
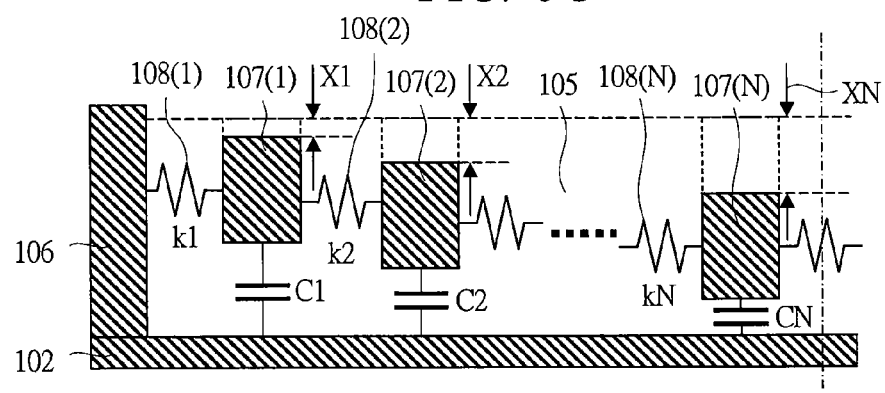
FIG. 5C is a schematic diagram for explaining a principle of the present invention.
Figure 5D:
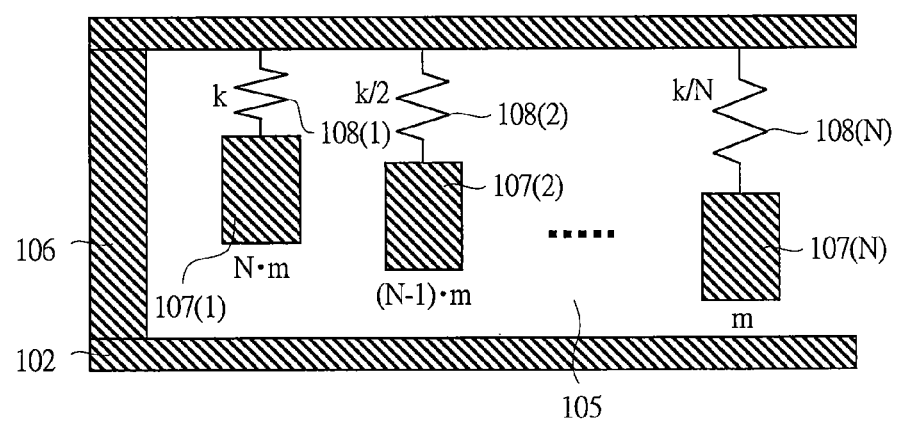
FIG. 5D is a schematic diagram for explaining a principle of the present invention.

On the assumption that the spring constants of all the beams 108(1) to 108(N) and the masses of the divided weights 107(1) to 107(N) are equal for simplification, the expression $Xj = (m/k)\cdot(N-j+1)\cdot j\cdot a$ is established by a simple calculation. Accordingly, for example, when the j-th divided weight 107(j) is to be considered, it can be interpreted that the mass effectively becomes (N−j+1) times and the spring constant becomes 1/j times. In other words, the system in FIG. 5C is equivalent to the structure in which the weights having the different masses and fixed to the frame 106 with the different spring constants are arranged as shown in FIG. 5D.

Figure 6A:
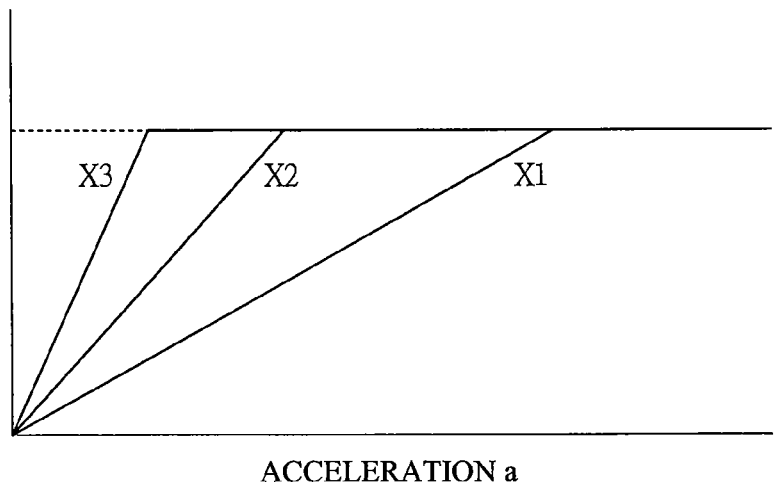
FIG. 6A is a characteristic diagram showing the characteristics of the present invention.
Figure 6B:
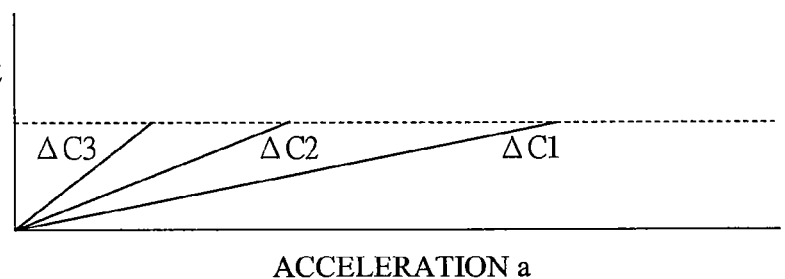
FIG. 6B is a characteristic diagram showing the characteristics of the present invention.
Figure 6C:
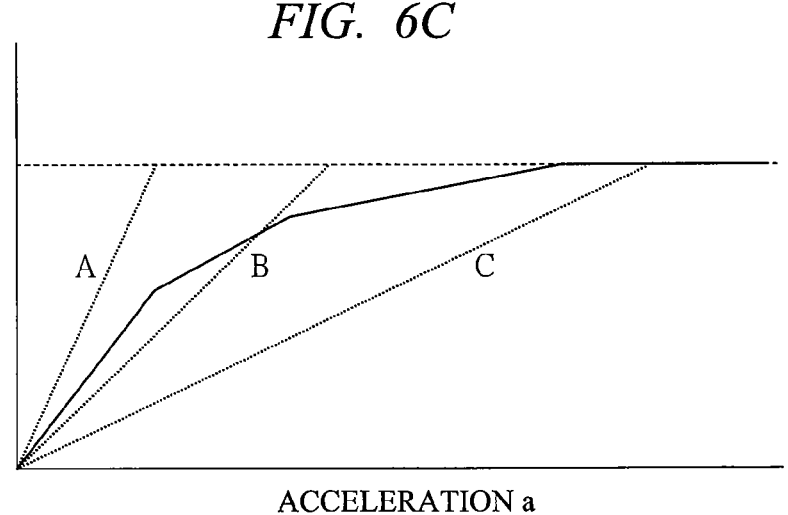
FIG. 6C is a characteristic diagram showing the characteristics of the present invention.

Next, it is assumed that an upper limit resulting from the limitation of the movable range of the divided weights 107(1) to 107(N) exists in the displacement amount of each of the divided weights 107(1) to 107(N). For example, in the case where six divided weights are arranged in parallel, the half thereof, that is, the divided weights 107(1) to 107(3) are considered on the assumption that the system is centrosymmetric. FIG. 6A to FIG. 6C show relations between the displacements Xj of the divided weights 107(1) to 107(3) and the applied acceleration, the capacitance changes $\Delta Cj$ and the applied acceleration, and the total $\Delta C$ of the capacitance change and the applied acceleration, respectively.

In FIG. 6A, reference symbols X1, X2 and X3 denote the displacements of the outermost divided weight, the second outermost divided weight and the center divided weight, respectively. The displacement X3 has the high sensitivity (displacement amount/acceleration) in the small acceleration region, but it reaches an upper limit of the displacement at the comparatively small acceleration. On the other hand, the displacement X1 has the small sensitivity in all the acceleration region, but it can be detected up to the large acceleration region. In other words, the displacement X3 of the divided weight 107(3) arranged at the center is largely changed even by the small acceleration. Accordingly, it is possible to improve the detecting sensitivity of the small acceleration. However, since the divided weight 107(3) is saturated by the comparatively small acceleration, it is hard to widen the measurable range of the acceleration only by the divided weight 107(3) arranged at the center. On the other hand, in the divided weight 107(1) arranged in the outermost side, the displacement amount by the applied acceleration is smaller in comparison with the divided weight 107(3). Accordingly, the detecting sensitivity of the acceleration becomes small. However, since the displacement amount is small with respect to the applied acceleration, the displacement is not saturated even if the comparatively large acceleration is applied. In short, the measurable range of the acceleration can be widened by the divided weight 107(1) arranged in the outermost side.

FIG. 6B shows the capacitance changes ΔC1 to ΔC3 between the respective divided weights 107(1) to 107(3) and the fixed electrode. It can be understood that the capacitance changes ΔC1 to ΔC3 shown in FIG. 6B correspond to the displacements X1 to X3 of the respective divided weights 107(1) to 107(3) shown in FIG. 6A. In other words, in the case where the acceleration is applied, the capacitance change ΔC3 of the divided weight 107(3) arranged at the center is large, but the capacitance change ΔC3 is saturated at the comparatively small acceleration. On the other hand, in the case where the acceleration is applied, the capacitance change ΔC1 of the divided weight 107(1) arranged at the outermost side is small, but the capacitance change ΔC1 is not saturated up to the comparatively large acceleration.

Accordingly, it can be understood that it is possible to have both the sensitivity in the low acceleration region and the non-saturation characteristic up to the high acceleration region, by detecting the total of the capacitance changes of the respective divided weights 107(1) to 107(3). For comparison, the characteristics in the case where one weight having the mass equal to the total mass of all the divided weights 107(1) to 107(3) is fixed by springs having various spring constants are shown by dotted lines A, B and C in FIG. 6C. On the other hand, the case of detecting the total of the capacitance changes of the respective divided weights 107(1) to 107(3) is shown by a solid line in FIG. 6C. It can be understood that the case shown by the solid line in FIG. 6C has an acceleration detecting sensitivity which is approximately equal to the case shown by the dotted line A in FIG. 6C and the capacitance change thereof is hard to be saturated in comparison with the case shown by the dotted line A. In other words, it can be understood that it is possible to greatly improve the detectable range of the acceleration in comparison with the case of the dotted line A in FIG. 6C. Also, it can be understood that, in comparison with the case of the dotted line B in FIG. 6C, the structure of the inertial sensor of the first embodiment (solid line in FIG. 6C) has a better sensitivity with respect to the small acceleration and better non-saturation characteristic up to the large acceleration. Further, when comparing the case of the solid line in FIG. 6C with the dotted line C in FIG. 6C, it can be understood that the cases of the solid line in FIG. 6C and the dotted line C in FIG. 6C have approximately the same non-saturation characteristic, but the detecting sensitivity of the acceleration is better in the case of the solid line in FIG. 6C, that is, in the structure of the inertial sensor in the first embodiment. As mentioned above, it can be understood according to the first embodiment that it is possible to achieve both the sensitivity in the low acceleration region and the non-saturation characteristic up to the high acceleration region by employing the structure in which the divided weights are connected to each other by the beams.

The feature of the first embodiment lies in the structure in which a plurality of divided weights 107(1) to 107(2N) are suspended to the fixed frame 106 by a plurality of beams 108(1) to 108(2N+1) as shown in FIG. 5A. As described above, the structure shown in FIG. 5A is equivalent to the structure shown in FIG. 5D if it is assumed that the system is centrosymmetric, the spring constants of all the beams 108(1) to 108(2N+1) are equal, and the masses of all the divided weights 107(1) to 107(2N) are equal. In other words, the j-th divided weight 107(j) from the outer side is equivalent to a system in which the mass is (N−j+1)m and the spring constant of the beam 108(j) connecting the divided weight 107(j) to the frame 106 is k/j. Accordingly, the divided weight 107(j) having smaller mass and spring constant is arranged at more inner position. Particularly, if 2N numbers of divided weights are provided, the mass of the divided weight 107(N) positioned at the center is m, and the spring constant of the beam 108(N) connected to the divided weight 107(N) is minimum, that is, k/N. Since the displacement amount in the case where the acceleration is applied becomes larger as the spring constant becomes smaller, the divided weight 107(N) arranged at the center displaces most with the highest sensitivity to the acceleration. More specifically, although the divided weight 107(N) is connected to the adjacent divided weight 107(N−1) by the beam 108(N) having the spring constant k as shown in FIG. 5A, since it is equivalent to the structure in which the mass is m and the spring constant of the beam connected to the divided weight 107(N) is k/N as shown in FIG. 5D, it can be regarded as if it is connected to the frame 106 with the spring constant k/N though it is connected by the beam 108(N) having the spring constant k. Therefore, it is possible to maintain the strength of the beam 108(N), and it is possible to improve the sensitivity in the low acceleration region. In other words, since the structure can be formed while keeping the spring constant of the beam 108(N) at k, it is possible to secure the strength in comparison with the case where the spring constant of the beam 108(N) is set to k/N. On the other hand, since the divided weight 107(N) is regarded as if it is connected to the frame 106 with the spring constant k/N though the divided weight 107(N) is connected by the beam 108(N) and the beam 108(N+1) having the spring constant k, it is possible to improve the sensitivity in the low acceleration region.

Further, the divided weight 107(1) arranged at the outermost side shown in FIG. 5A is equivalent to the structure in which the weight having the mass Nm is connected to the frame 106 via the beam having the spring constant k as shown in FIG. 5D. Since the mass is Nm as mentioned above, the weight is hard to displace with respect to the applied acceleration, and the non-saturation characteristic up to the high acceleration region becomes preferable. Accordingly, as can be understood from the first embodiment, by using all the displacements of a plurality of divided weights 107(1) to 107(2N) for detecting the acceleration, both the sensitivity in the low acceleration region and the non-saturation characteristic up to the high acceleration region can be achieved, while securing the strength of the inertial sensor. More specifically, by using the displacement of the divided weight arranged in the center part mainly for detecting the acceleration in the low acceleration region, and using the displacement of the divided weight arranged in the outer side mainly for detecting the acceleration in the high acceleration region, both the sensitivity in the low acceleration region and the non-saturation characteristic up to the high acceleration region can be achieved.

Although the structure (FIG. 5A) of the inertial sensor in the first embodiment is equivalent to FIG. 5D, by employing the structure in FIG. 5A, more advantageous points than the case of employing the structure in FIG. 5D can be achieved. In other words, in the structure shown in FIG. 5D, the divided weight 107(N) positioned at the center is connected to the frame 106. The spring constant of the beam 108(N) used for this connection has to be set to k/N. However, if the spring constant is made smaller, a problem occurs due to the restriction on the processing of the beam (spring), the durability or the like. On the contrary, in the structure (FIG. 5A) of the inertial sensor in the first embodiment, the divided weight 107(N) itself positioned at the center is connected to the adjacent divided weight 107(N−1) and the adjacent divided weight 107(N+1) by the beam 108(N) and the beam 108

(N+1) having the spring constant k. More specifically, since the spring constant is k and it is not necessary to set the spring constant to k/N, the strength of the beam can be maintained. On the other hand, since the divided weight 107(N) is regarded as if it is connected to the frame 106 with the spring constant k/N though the divided weight 107(N) is connected by the beam 108(N) and the beam (N+1) having the spring constant k, it is possible to improve the sensitivity in the low acceleration region. In this manner, in the structure shown in FIG. 5A, it is possible to improve the sensitivity in the low acceleration region similarly to the structure shown in FIG. 5D. In addition, in the structure shown in FIG. 5A, an effect that the mechanical strength of the beam can be improved in comparison with the structure shown in FIG. 5D can be obtained. Further, in the structure shown in FIG. 5A, since it is possible to equalize the masses of the divided weights 107(1) to 107(2N) and the spring constants of the beams 108(1) to 108(2N+1), the size of the structure can be advantageously reduced in comparison with the structure in FIG. 5D in which the divided beams having the different masses and the beams having the different spring constants are formed.

The structure of the first embodiment is configured so that the masses of the divided weights 107(1) to 107(2N) and the spring constants of the beams 108(1) to 108(2N+1) are the same as shown in FIG. 5A. However, even if the structure is configured so that the masses of the divided weights 107(1) to 107(2N) and the spring constants of the beams 108(1) to 108(2N+1) are different from each other, the similar effects can be obtained. In particular, by preparing the distributions for the spring constants, the mass of the divided weights and an area of the capacitance formed by each of the divided weights, it is possible to adjust the shape of the characteristic curves shown in FIG. 6A to FIG. 6C. For example, by making the spring constant in the center part softer (smaller) in comparison with that in the periphery (outer side), the sensitivity in the low acceleration region can be improved.

Further, it is desirable that a larger number of the divided weights 107(1) to 107(2N) are arranged. When the number of the divided weights 107(1) to 107(2N) is large, the value N becomes larger, and an apparent spring constant k/N of the beam connected to the divided weight 107(N) positioned at the center becomes smaller. Accordingly, the detecting sensitivity in the low acceleration region can be improved. Further, it is desirable that some divided weights 107(1) to 107(2N) are not fixed to the frame 106 and are connected only to the divided weights by the beams. For example, the divided weights 107(2) to 107(2N−1) in FIG. 5A correspond to the divided weights mentioned above. Since the divided weight which is not fixed to the frame 106 and is connected only to the divided weight by the beam has a large displacement with respect to the acceleration, the detecting sensitivity of the acceleration can be improved.

Further, in the first embodiment, there is a limit of the movable range of the divided weights 107(1) to 107(2N). This is because there is a limit of the elastic deformation of the beams 108(1) to 108(2N+1). In other words, this is because it is necessary to prevent the beams 108(1) to 108(2N+1) from remaining extended in the case where the force at the elastically deformable limit or more is applied to the beams 108(1) to 108(2N+1), thereby improving the reliability of the inertial sensor. However, in the case where no problem occurs even if it is set that the force does not exceed the elastically deformable limit of the beams 108(1) to 108(2N+1), it is not necessary to set the limit to the movable range of the divided weights 107(1) to 107(2N). In general, a relation between the force applied to the beam (spring) and the displacement is linear in the small displacement region. However, when the deforming amount is increased, the spring constant is increased and the spring is hard to displace (displacement amount is saturated). This is because of the change of Young's modulus due to the displacement. In the case where there is no limit to the movable range of the divided weight, it is possible to obtain approximately the same effect by this characteristic. In this case, however, it is desirable to intentionally change the spring constant of the beam connected to each of the divided weights (introduce the distribution). This is because, by this means, it becomes possible to change the acceleration at which the saturation of the displacement amount starts.

Next, the effect that the sensitivity is amplified by the inclination (angle effect) of the divided weight itself according to the first embodiment will be described. In other words, a point that a plurality of different deformation modes of the sensitivity region to the acceleration can be used in combination according to the first embodiment will be described.

Figure 7A:
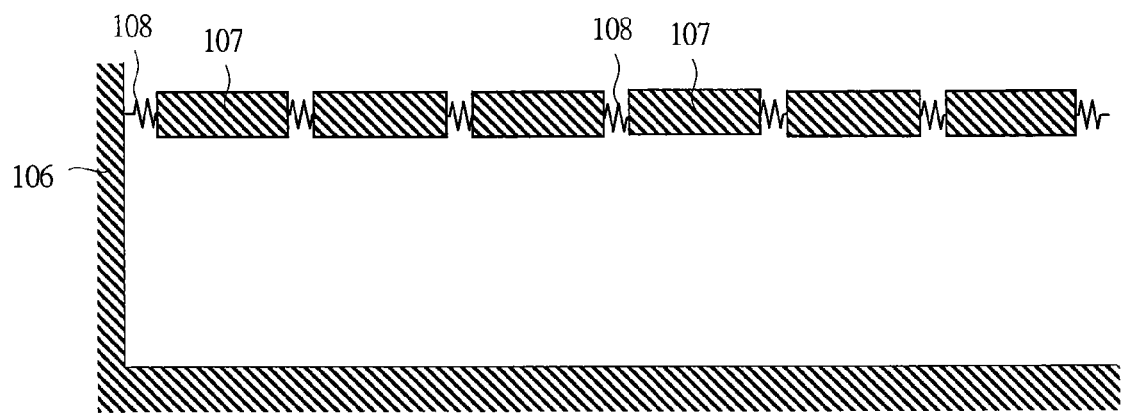
FIG. 7A is a schematic diagram for explaining a deformation mode according to the present invention.
Figure 7B:
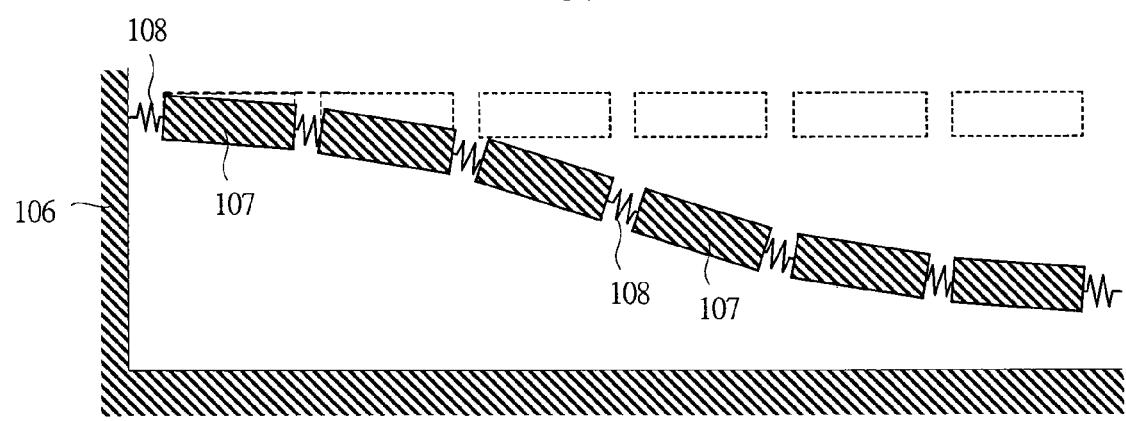
FIG. 7B is a schematic diagram for explaining a deformation mode according to the present invention.

A system in which the divided weights 107 connected to each other in series by the beams 108 are fixed to the frame 106 in both ends (system is centrosymmetric, and half thereof is shown in the drawing) as shown in FIG. 7A will be considered. It is assumed in FIG. 7 that each of the divided weights 107 has a finite length as is different from FIG. 5. In the case where each of the divided weights 107 has the finite length as described above, the deformation by the beam bending (or torsional) mode is generated in addition to the deformation caused by the expansion and contraction of the beam 108 (expansion and contraction mode). Therefore, each of the divided weights 107 is inclined as shown in FIG. 7B, and a substantial displacement amount is enlarged. More specifically, since the deformation by the expansion and contraction mode and the deformation by the bending (or torsional) mode are combined, the displacement amount is enlarged and the sensitivity is improved. It is also possible to positively use the bending (or torsional) mode mentioned above. Based on the difference of the average displacement to the acceleration sensitivity by the bending (or torsional) mode and the expansion and contraction mode, both the sensitivities to the low acceleration region and the high acceleration region can be achieved. More specifically, by utilizing the fact that the displacement by the bending (or torsional) mode and the displacement by the expansion and contraction mode have a difference depending on the applied acceleration, the sensitivities with respect to both the low acceleration region and the high acceleration region can be improved. In other words, the movable structure body constituted by a plurality of divided weights 107 and a plurality of beams 108 connecting the plurality of divided weights 107 has a plurality of deformation modes having the different sensitivity regions with respect to the acceleration. As mentioned above, according to the first embodiment, it is possible to use a plurality of deformation modes having the different sensitivity regions with respect to the acceleration in combination.

Figure 8A:
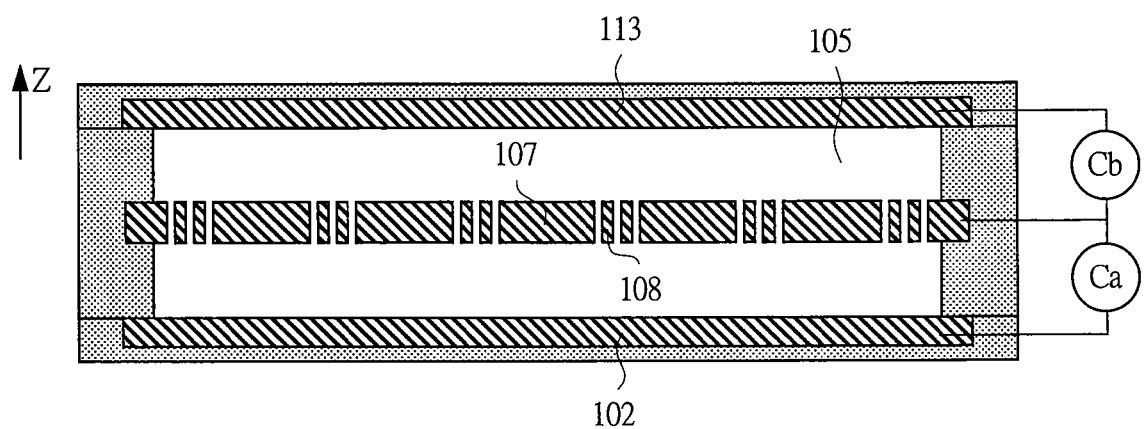
FIG. 8A is a schematic cross sectional view for explaining an operation of the inertial sensor according to the first embodiment.

The inertial sensor according to the first embodiment is configured as mentioned above, and an operation thereof will be described below. FIG. 8 is a cross sectional view (corresponding to a cross section taken along the line A-A' in FIG. 1) schematically showing a cross section of the sensor mechanism portion of the inertial sensor according to the first embodiment. As shown in FIG. 8A, a plurality of divided weights 107 are connected via the beams 108 formed in the same layer as the divided weights 107 inside the cavity portion 105, and both ends thereof are fixed to the interlayer insulating film via the beams 108. The fixed electrode (lower electrode) 102 and the upper electrode 113 are formed in the cavity portion 105, and capacitor elements Ca and Cb are formed between the fixed electrode (lower electrode) 102 and the divided weight 107 and between the divided weight 107 and the upper electrode 113. In this case, an example in which both the fixed electrode (lower electrode) 102 and the upper electrode 113 are formed has been shown here, but the structure in which only one of the fixed electrode (lower electrode) 102 and the upper electrode 113 is formed is also available.

Figure 8B:
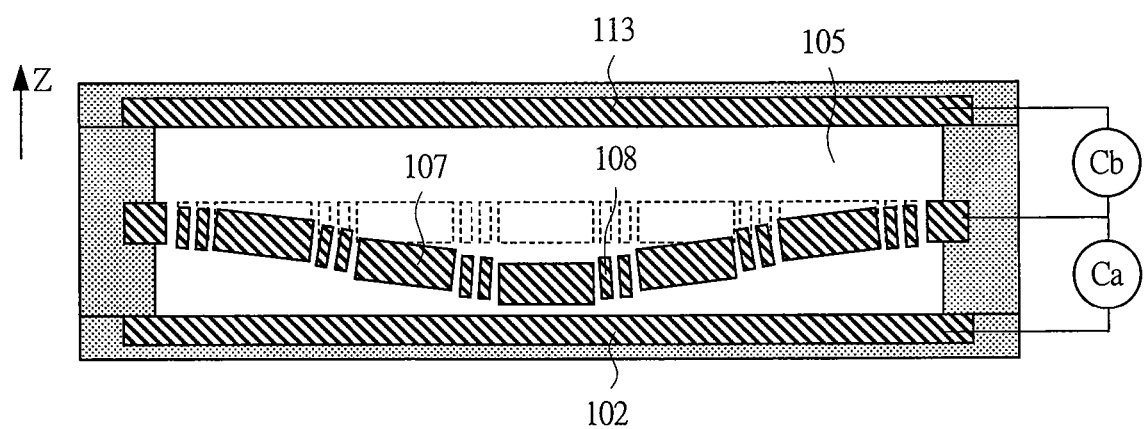
FIG. 8B is a schematic cross sectional view for explaining an operation of the inertial sensor according to the first embodiment.

When the acceleration is applied in a vertical direction (direction of the Z axis) to the substrate having the inertial sensor formed thereon, the beam 108 is elastically deformed and the position of the divided weight 107 displaces in the direction of the Z axis inside the cavity portion 105 as shown in FIG. 8B. The displacement amount is detected as the capacitance change between the divided weight 107 and the fixed electrode (lower electrode) 102 or between the divided weight 107 and the upper electrode 113. In this case, if the applied acceleration is small, the divided weight 107 arranged near the center of the cavity portion 105 mainly displaces, and the displacement is detected as the capacitance change between a plurality of divided weights 107 and the fixed electrode (lower electrode) 102 or between a plurality of divided weights 107 and the upper electrode 113. Then, if the applied acceleration is enlarged, the divided weight 107 arranged near the center of the cavity portion 105 comes into contact with the fixed electrode (lower electrode) 102 and does not displace any more. At this time, the insulating film is formed on the surface of the divided weight 107, which prevents the divided weight 107 and the fixed electrode (lower electrode) 102 from being conducted even if they are in contact with each other. Therefore, the displacement of the divided weight 107 arranged near the center of the cavity portion 105 is saturated and the capacitance change is stopped. On the other hand, since the divided weight 107 arranged in the periphery of the cavity portion 105 displaces, when the acceleration is enlarged, the capacitance change occurs between a plurality of divided weights 107 and the fixed electrode (lower electrode) 102 or between a plurality of divided weights 107 and the upper electrode 113 due to the displacement of the divided weight 107 arranged in the periphery of the cavity portion 105. In this manner, in the inertial sensor according to the first embodiment, it can be understood that the capacitance change occurs from the low acceleration region to the high acceleration region.

Figure 9:
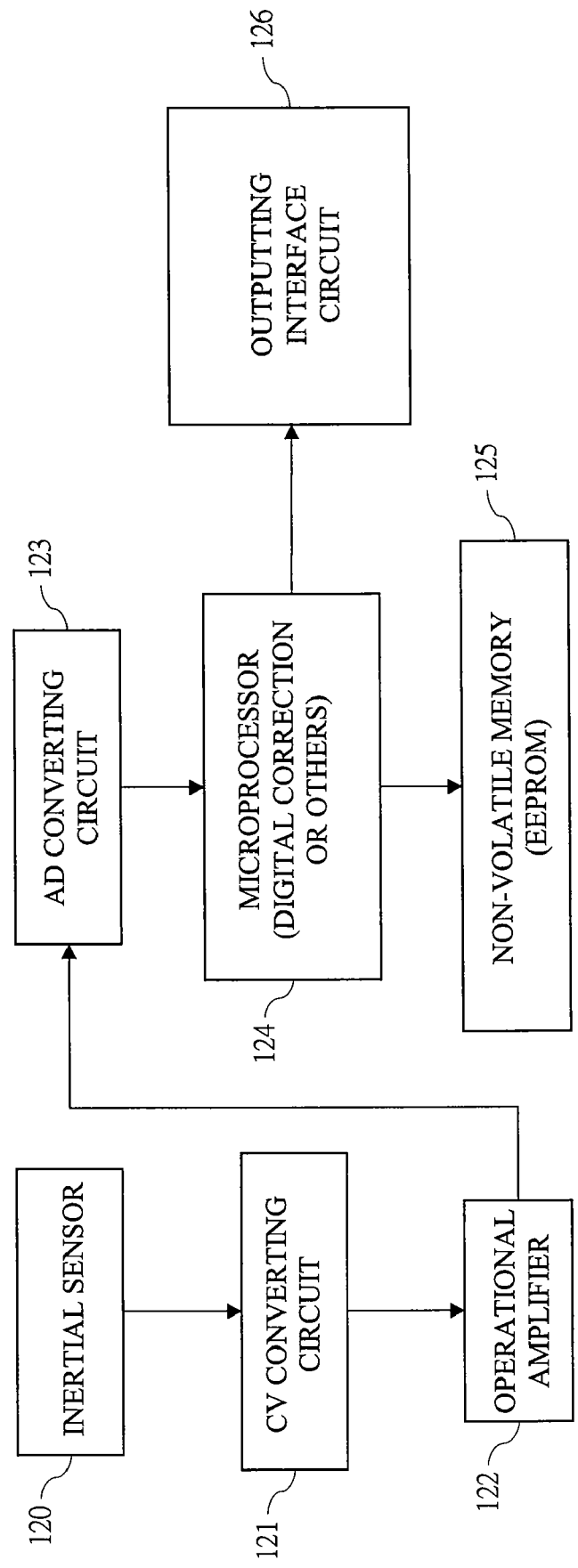
FIG. 9 is a block diagram showing a structure of a signal detecting circuit of the inertial sensor according to the first embodiment.

The capacitance change caused in accordance with the displacement of the divided weight 107 is processed by the signal detecting circuit. FIG. 9 is a circuit block diagram of the signal detecting circuit. As shown in FIG. 9, the acceleration is detected as the displacement of the divided weight 107 by the inertial sensor 120 mentioned above, and the displacement of the divided weight 107 is detected as the capacitance changes of the capacitor elements Ca and Cb. The divided weight 107, the fixed electrode (lower electrode) 102 and the upper electrode 113 are connected to a signal processing integrated circuit formed on the same substrate. First, as shown in FIG. 9, the capacitance change detected by the inertial sensor 120 is converted into a voltage signal by a capacitance-voltage converting circuit (CV converting circuit) 121. Then, after the converted voltage signal is amplified by an operational amplifier 122, it is converted into a digital signal from an analogue signal by an AD converting circuit 123. Subsequently, the digital signal is subjected to various corrections such as a temperature, an amplifier characteristic and others on the basis of data stored in a non-volatile memory 125 by a microprocessor 124. Further, the corrected digital signal is outputted as an acceleration signal to outside via an output interface circuit 126. In this manner, the acceleration can be detected by the inertial sensor according to the first embodiment.

Next, a manufacturing method of the inertial sensor according to the first embodiment will be described. First, a manufacturing method will be described in brief. The interlayer insulating film (also functioning as a sacrifice layer) is formed on a predetermined semiconductor substrate, and a structure body formed by using a first thin film is embedded inside the interlayer insulating film. At this time, the structure body is configured so as to include a plurality of divided weights connected to each other by the beams. Next, a second thin film is formed on the interlayer insulating film, and an opening portion is formed at a predetermined position of the second thin film on the region in which the structure body exists. Thereafter, the cavity portion is formed in the interlayer insulating film by selectively etching and removing a part of the interlayer insulating film via the opening portion. At this time, the structure body formed by using the first thin film is arranged in the cavity portion. In other words, a plurality of divided weights are suspended to the cavity portion via the beams. Next, the opening portion is sealed by depositing a predetermined sealing material. Since the cavity portion is formed below the region in which the opening portion exists, a shape of the cavity portion can be adjusted by appropriately setting a layout of the opening portion. Accordingly, by providing a region, in which the opening portion does not exist, in a part of the region in which the opening portion exists, the interlayer insulating film is left in a part of the cavity portion, thereby forming a support portion (pillar). Specifically, the interlayer insulating film is left in the regions sandwiched between the divided weights formed of the first thin film, between the divided weight and the beam, and between the beams, in the interlayer insulating film. By this means, it is possible to form the support portions in the regions in which the divided weight and the beam are not formed.

As the material of the interlayer insulating film, for example, a silicon oxide film or the like formed by using the multilayer wiring process of the LSI can be employed. Then, in this interlayer insulating film, the beam and the divided weight corresponding to the structure body are formed in the first thin film which is formed of metal or a semiconductor material such as a tungsten film (W), a tungsten silicide film (WSi), a polysilicon film or the like. Further, after forming a metal thin film (second thin film) having a predetermined opening portion above the structure body, the interlayer insulating film around the structure body is selectively etched and removed via the opening portion. In this manner, the cavity portion is formed around the structure body. Thereafter, the opening portion formed in the second thin film is sealed.

A wet etching by an HF water solution, a vapor phase etching by a vapor HF or the like can be used for the etching for forming the cavity portion. Further, a thin film (for example, a silicon oxide film by a thermal CVD method) having a conformal deposition characteristic is preferably used for sealing the opening portion. These materials are widely used in the manufacturing process of the LSI. Therefore, in the present invention, the structure body of the inertial sensor and the cavity portion having a large area (large volume) for providing the structure body can be formed by using the standard LSI manufacturing process, in particular, a standard wiring process corresponding to a part of the LSI manufacturing process.

Alternatively, a metal (semiconductor) film such as a polysilicon can be used instead of the interlayer insulating film, a conductor film coated with an insulating film such as a silicon oxide film can be used for the first thin film, and a vapor phase etching by XeF$_2$ can be used for the etching of the sacrifice layer (interlayer insulating film) for forming the cavity portion. Further, the structure body including the beam, the divided weight and the like can be formed by any one of a wiring layer, a polysilicon film, a SiGe layer and an active layer of the SOI substrate or an optional combination thereof. Further, when the opening portion is sealed by depositing a sealing film, by providing an opening pattern having relatively large dimensions, the sealing film functioning as the support portion (pillar) which supports the lid can be deposited inside the cavity portion.

The inertial sensor (MEMS) can be integrated with the LSI (semiconductor integrated circuit device). As a method for the integration, after forming a transistor of the LSI on a silicon substrate, the structure body of the inertial sensor is formed in the interlayer insulating film on the same substrate at the same time of forming the multilayer wiring on the transistor, and then, the cavity portion is formed and then sealed. As another method for the integration, after forming the structure body of the inertial sensor on the silicon substrate, the LSI is formed on the same substrate, and then, the cavity portion is formed and sealed.

As described above, in the manufacturing method of the inertial sensor according to the first embodiment, the movable structure body having the comparatively large area can be sealed and mounted in the cavity having the large area through the standard CMOS process. Accordingly, it is possible to mount the inertial sensor together with the LSI or the different type of sensor in a monolithic manner. In particular, since it is possible to form the mechanism portion of the inertial sensor simultaneously with the wiring of the LSI, it is easy to integrate the inertial sensor with the LSI. Further, since the mechanism portion of the inertial sensor can be formed in the upper portion of the LSI circuit region, it is possible to reduce the size of the chip. Also, the inertial sensor by the MEMS can be mounted by completely the same mounting technology as a normal LSI such as the plastic package. Accordingly, it is possible to achieve the size reduction of the inertial sensor, performance improvement thereof, and the cost reduction.

Figure 10A:
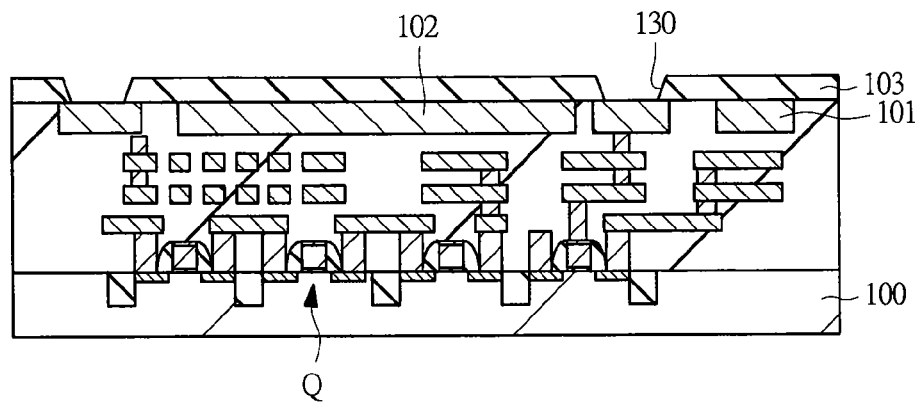
FIG. 10A is a cross sectional view showing a manufacturing process of the inertial sensor according to an embodiment.

Next, the manufacturing method of the inertial sensor according to the first embodiment will be described with reference to the accompanying drawings. As shown in FIG. 10A, a MISFET (transistor) Q for the signal processing of the inertial sensor is formed on a semiconductor substrate (silicon substrate) 100 made of single crystal silicon in accordance with the normal CMOS process (LSI forming process). Then, plugs connecting the MISFET Q and the multilayer wirings are formed by using a normal technology for wiring process. Further, the wiring 101 in a fourth layer of the multilayer wiring is formed by using a photolithography technology and an etching technology. The fixed electrode 102 of the inertial sensor is formed in the same layer as the wiring 101.

Subsequently, an interlayer insulating film (first interlayer insulating film) 103 constituted by a silicon oxide film is formed on the wiring 101 and the fixed electrode 102 by, for example, using a plasma CVD method. Thereafter, the surface of the interlayer insulating film 103 is planarized by using a chemical mechanical polishing (CMP), thereby forming a first sensor via 130. The first sensor via 130 connects a predetermined wiring of the fourth wiring layer and the sensor first layer mentioned below.

Figure 10B:
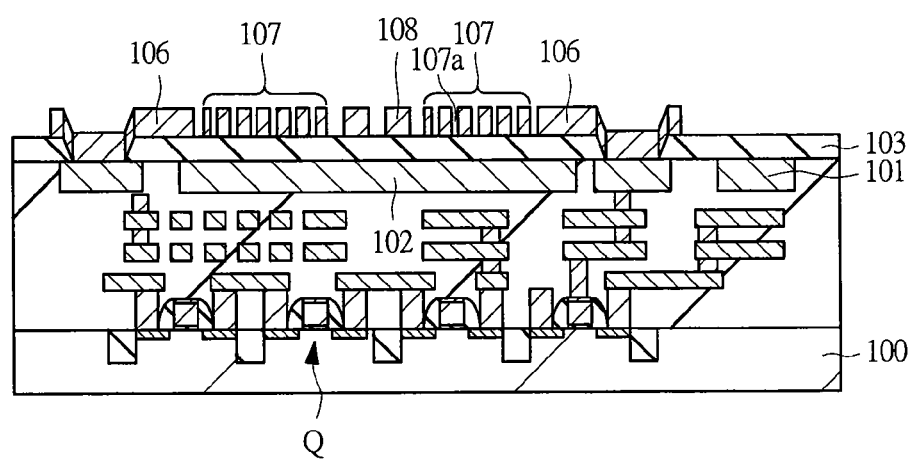
FIG. 10B is a cross sectional view showing a manufacturing process of the inertial sensor subsequent to FIG. 10A.

Next, as shown in FIG. 10B, a tungsten silicide (WSi) film having a film thickness of 1 μm is formed as the sensor first layer (first thin film) by a sputtering method. Thereafter, the patterning as shown in FIG. 1 is performed by a predetermined photolithography technology and a dry etching technology. By this means, the frame 106 of the inertial sensor, a plurality of divided weights 107 also functioning as the movable electrode, a plurality of beams (elastic bodies) 108 connecting the plurality of divided weights 107, and the wiring pattern for the sensor are formed. Although not shown in FIG. 1, etching holes (second etching hole) 107a are appropriately formed in the divided weight 107 in the sensor first layer. The etching holes 107a are provided for removing the interlayer insulating film (sacrifice layer) 103 below the divided weight 107 when etching the interlayer insulating film 103.

Figure 10C:
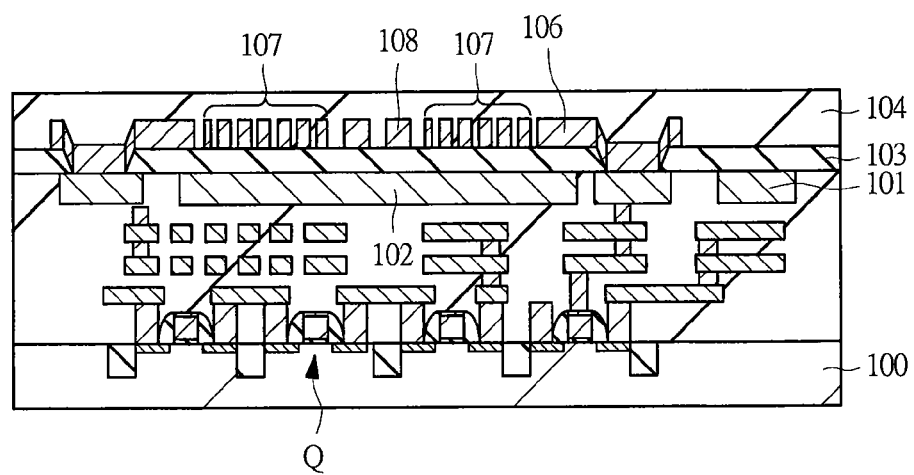
FIG. 10C is a cross sectional view showing a manufacturing process of the inertial sensor subsequent to FIG. 10B.

Subsequently, as shown in FIG. 10C, the interlayer insulating film (second interlayer insulating film) 104 constituted by a silicon oxide film is deposited on the interlayer insulating film 103 including the sensor first layer by using the plasma CVD method. Then, the surface of the interlayer insulating film 104 is planarized by the CMP method. In this case, a second sensor via (not shown) is formed according to need. The second sensor via connects the wiring pattern for the sensor in the sensor first layer to a sensor second layer mentioned below.

Figure 11A:
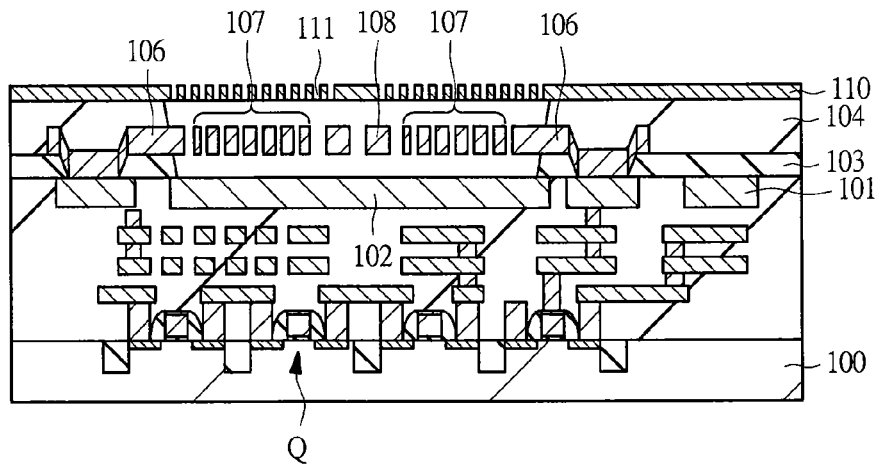
FIG. 11A is a cross sectional view showing a manufacturing process of the inertial sensor subsequent to FIG. 10C.
Figure 11B:
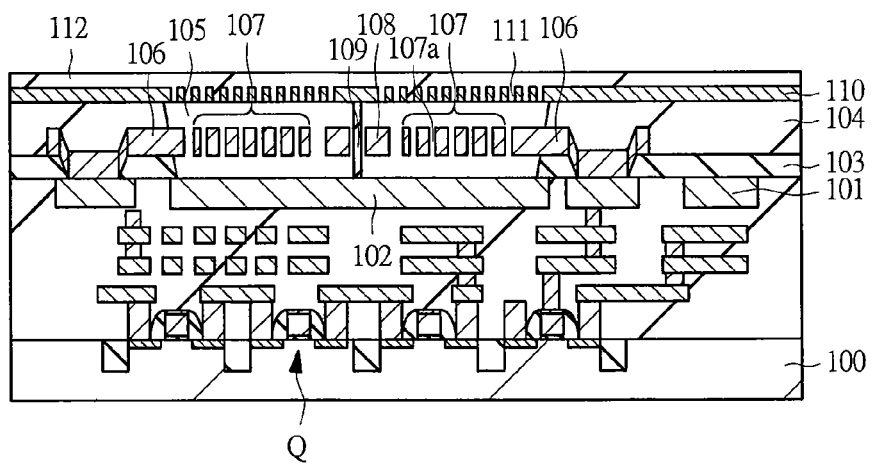
FIG. 11B is a cross sectional view showing a manufacturing process of the inertial sensor subsequent to FIG. 11A.

Next, as shown in FIG. 11A, the tungsten silicide film having the film thickness of 1 μm is formed as the sensor second layer (second thin film 110) by the sputtering method. Thereafter, patterning as shown in FIG. 4 is performed by the predetermined lithography technology and the dry etching technology, thereby forming the etching holes (first etching hole) 111. A diameter of the etching hole 111 and a width of the slit are set to about 300 nm. Next, as shown in FIG. 11B, the interlayer insulating films (sacrifice layers) 103 and 104 are etched and removed via the etching holes 111 (for relaxing a stress) and a slit opening pattern (not shown) formed in the sensor second layer (second thin film 110) and the etching holes 107a formed in the divided weight 107. By this means, the cavity portion 105 is formed below the region in which the etching holes 111 exist. Since the interlayer insulating films (sacrifice layers) 103 and 104 are not removed by etching below the region in which the etching holes 111 are not arranged, the support portions (pillar) 109 constituted by the interlayer insulating films (sacrifice layers) 103 and 104 which support the sensor second layer in the cavity portion 105 are formed as shown in FIG. 3. The region in which the etching hole 111 is not arranged in the sensor second layer is arranged so as to avoid the forming region of the divided weight 107 and the beam 108 in the sensor first layer. Thus, the support portion (pillar) 109 does not hinder the motion of the movable structure body.

In this case, one of the features of the present invention lies in that the cavity portion 105 is formed in the forming region of a plurality of divided weights 107 and a plurality of beams 108, and the support portion 109 which supports the cavity portion 105 is formed by leaving the interlayer insulating films 103 and 104 below the region in which the etching hole 111 is not formed. In other words, the etching holes 111 formed in the second thin film 110 are non-uniformly formed as shown in FIG. 4. More specifically, the etching hole 111 is formed in the second thin film below which the divided weight 107 or the beam 108 exists, and the etching hole 111 is not formed in the region below which the divided weight 107 or the beam 108 does not exist. By forming the etching holes 111 in the above-described manner, when the interlayer insulating films 103 and 104 existing below the second thin film 110 are etched through the etching holes 111, the interlayer insulating films 103 and 104 in the region in which the divided weight 107 or the beam 108 exists are etched and the cavity portion 105 is formed. Accordingly, the divided weight 107 is suspended by the beam 108 in the cavity portion 105.

On the other hand, in the region in which the etching hole 111 is not formed, a part of the interlayer insulating films 103 and 104 is not etched, and the support portion 109 constituted by the interlayer insulating films 103 and 104 is formed in the cavity portion 105. Specifically, the region in which the etching hole 111 is not formed corresponds to the region in which the divided weight 107 or the beam 108 is not formed, and it is formed in the region between the divided weight 107 and the divided weight 107, in the region between the divided weight 107 and the beam 108, and in the region between the beam 108 and the beam 108 as shown in FIG. 3. In this manner, since the support portion 109 is arranged so as to avoid the forming region of the divided weight 107 and the beam 108, the support portion (pillar) 109 does not hinder the motion of the movable structure body. On the other hand, since the lid constituted by the second thin film 110 formed on the cavity portion 105 can be supported by the support portion 109, it is possible to secure the strength of the cavity portion 105. Further, the support portion 109 is formed by leaving a part of the interlayer insulating films 103 and 104 when forming the cavity portion 105. In other words, since the support portion 109 can be formed at the same time of forming the cavity portion 105, the process can be simplified. Also, since the cavity portion 105 and the support portion 109 can be formed by the etching technology used in the normal CMOS process, the inertial sensor can be formed in the manufacturing process of the LSI.

Further, one of the features of the present invention lies in that the etching holes 107a are formed in the divided weight 107. Accordingly, it is possible to sufficiently remove the interlayer insulating film 103 existing below the divided weight 107 in the etching for forming the cavity portion 105. In other words, the cavity portion 105 is formed by etching the interlayer insulating films 103 and 104 through the etching holes 111 existing above the divided weight 107. Therefore, if the etching hole 107a is not formed in the divided weight 107, it is hard to etch the interlayer insulating film 103 existing below the divided weight 107. For its prevention, in the first embodiment, a plurality of etching holes 107a are formed in the divided weight 107. By this means, since the etching solution can pass through the etching holes 107a formed in the divided weight 107, the interlayer insulating film 103 existing below the divided weight 107 can be sufficiently removed.

Figure 11C:
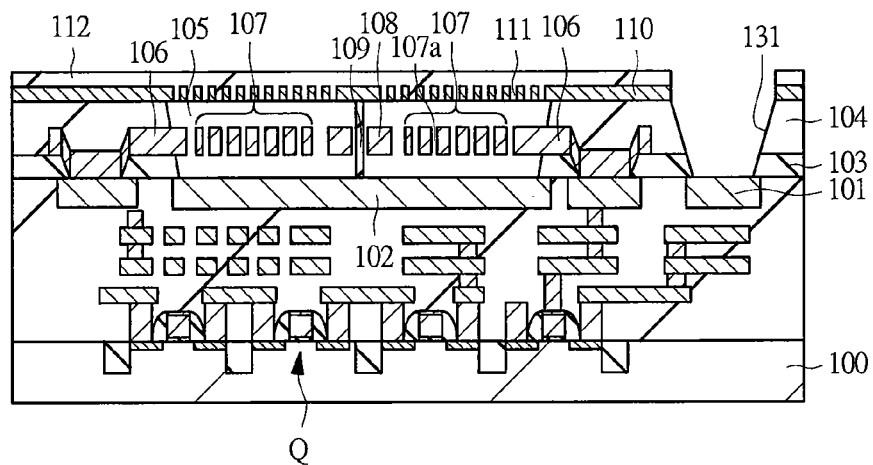
FIG. 11C is a cross sectional view showing a manufacturing process of the inertial sensor subsequent to FIG. 11B.

Next, a silicon oxide film 112 is deposited on the sensor second layer (second thin film 110) by, for example, the thermal CVD method. By doing so, the etching holes 111 and the slit opening pattern (not shown) are sealed. Further, a passivation film constituted by a silicon nitride film is deposited on the silicon oxide film 112 (not show). Since a width of the slit opening pattern is smaller than a gap between the fourth wiring layer and the sensor first layer and a gap between the sensor first layer and the sensor second layer, the silicon oxide film 112 formed by the thermal CVD method is almost uniformly deposited on the surface of the sensor first layer and the surface including the etching holes 111 of the second layer and the sidewall of the slit. Then, after the etching hole 111 and the slit are filled, it is deposited only on the surface of the sensor second layer. Further, as shown in FIG. 11C, a pad opening portion 131 is formed on the wiring pad formed by the fourth layer wiring 101 according to need. In this manner, the inertial sensor according to the first embodiment can be manufactured.

As described above, in the manufacturing method of the inertial sensor according to the first embodiment, the movable structure body having the comparatively large area can be sealed and mounted in the cavity having the large area through the standard CMOS process. Accordingly, it is possible to mount the inertial sensor together with the LSI or the different type of sensor in a monolithic manner. In particular, since it is possible to form the mechanism portion of the inertial sensor simultaneously with the wiring of the LSI, it is easy to integrate the inertial sensor with the LSI. Further, since the mechanism portion of the inertial sensor can be formed in the upper portion of the LSI circuit region, it is possible to reduce the size of the chip. Also, the inertial sensor by the MEMS can be mounted by completely the same mounting technology as a normal LSI such as the plastic package. Accordingly, it is possible to achieve the size reduction of the inertial sensor, performance improvement thereof, and the cost reduction.

In the description above, the interlayer insulating film 104 on the sensor first layer is planarized by the CMP method. Alternatively, after depositing a silicon oxide film in a conformal manner by the plasma CVD method, a whole surface is etched to form a so-called sidewall around the divided weight 107 and the beam 108, and further a silicon oxide film is formed. By this means, the irregularity in the periphery of the divided weight 107 and the beam 108 can be reduced.

Further, the concavity and convexity on the surface of the interlayer insulating layer 104 can be suppressed by making the maximum slit width (pattern width) in the main part of the sensor first layer sufficiently smaller (at least equal level to or less) than the film thickness of the interlayer insulating film 104 between the sensor first layer and the sensor second layer.

Another material, for example, a tungsten (W) film can be used as the material of the sensor first layer or the sensor second layer. An advantage of a tungsten film or a tungsten silicide film exists in that it is possible to sufficiently secure an etching selectivity between the interlayer insulating films 103 and 104 when the cavity portion 105 is formed by the etching using hydrofluoric acid. The film thicknesses of these films are not limited to the values shown in the description above. Further, the etching of the interlayer insulating films 103 and 104 is executed when forming the cavity portion 105, and if the vapor HF is used for this etching, an aluminum film may be used as a material of the sensor first layer or the sensor second layer.

The etching hole 111 for forming the cavity portion 105 and the slit opening pattern for relaxing the stress are formed by a normal i-ray exposure. Alternatively, it is also possible to use a so-called hole reduction process. Further, a tungsten silicide film is processed by a normal dry etching in which a resist pattern is used as a mask, but it is also possible to use a so-called hard mask process by means of a silicon oxide film according to need.

As the etching of the interlayer insulating films (sacrifice layers) 103 and 104, a vapor phase etching using a vapor hydrofluoric acid is used in order to prevent the adhesion or the breakage of the sealing film due to a capillary force of the liquid remaining in the cavity portion 105 in the drying step executed after the etching. However, it is also possible to use the hydrofluoric acid of the normal liquid phase depending on the gap amount of the cavity portion 105.

Since an etching rate of the tungsten silicide film is very small, the patterns of the divided weight 107 and the beam 108 are left in the cavity portion 105. Also, since the fourth layer wiring having a TiN film is formed over the lower region of the cavity portion 105, and an etching rate of the TiN film is also very small, the lower surface of the cavity portion 105 is defined. Since the interlayer insulating films 103 and 104 existing in upper and lower sides of the divided weight 107 and the beam 108 of the sensor first layer are removed almost simultaneously, the divided weight 107 is put into a state of being suspended in the cavity portion 105 by the beam 108 fixed to the side surface of the cavity portion 105. Since the beam 108 is elastically deformable, it elastically deforms by absorbing the residual stress of the divided weight 107 and the beam 108. Therefore, the stresses of the divided weight 107 and the beam 108 are extremely low, and the films constituting the divided weight 107 and the beam 108 are not deformed up and down.

Figure 12:
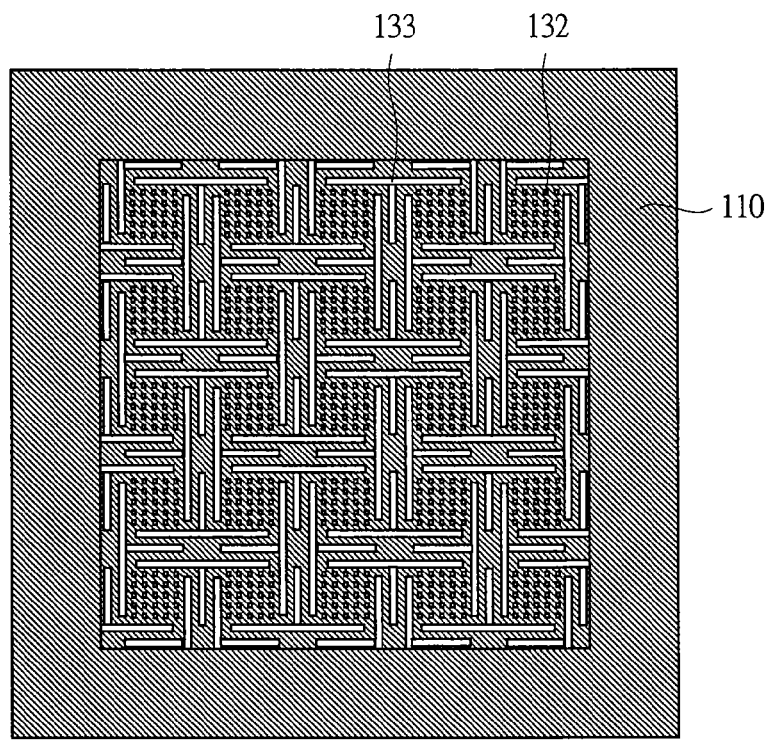
FIG. 12 is a plan view showing a modified example of the layout pattern of the etching holes provided in the lid which covers the cavity portion in the inertial sensor according to the first embodiment.
Figure 13:
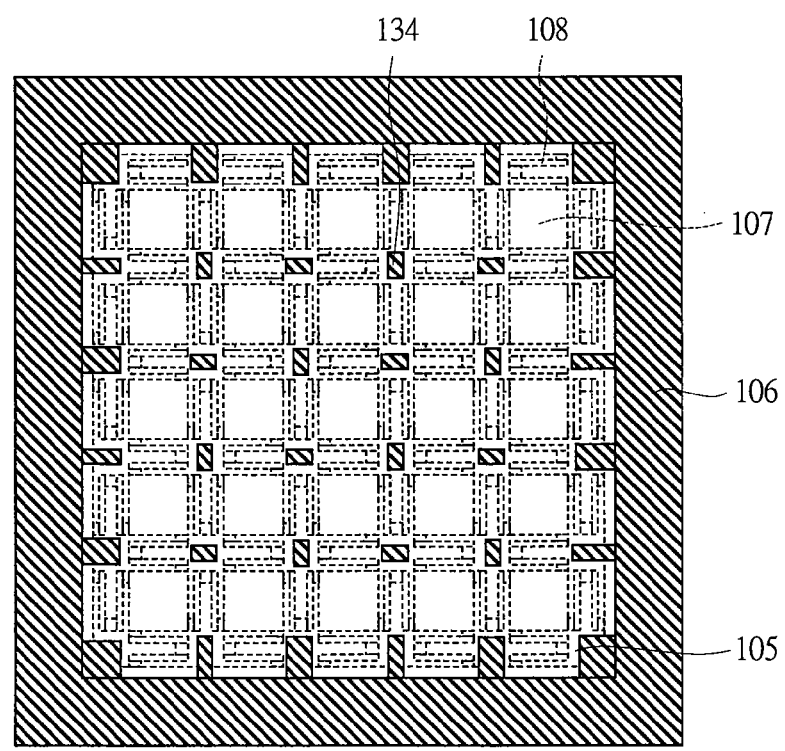
FIG. 13 is a plan view showing a modified example of the planar layout of the support portion arranged in the cavity in the inertial sensor according to the first embodiment.

The pattern of the etching hole 111 formed in the sensor second layer is not limited to the shape shown in FIG. 4, but can have various shapes. For example, it cab be formed to have a shape as shown in FIG. 12. In FIG. 12, minute etching holes 132 are arranged above each of the divided weights, and a plurality of elongated slits 133 are provided above the beams which connects the divided weights. Since the etching hole 132 and the slit 133 do not exist on an intersection portion of diagonal lines (in a direction of ±45 degrees) which connect the centers of the respective divided weights, the interlayer insulating film (sacrifice film) in this region is not removed by etching, and a support portion (support pillar) 134 of a lid of the cavity portion is formed in a region in which the divided weight 107 and the beam 108 do not exist as shown in FIG. 13. Since the sensor second layer (cavity lid) is fixed by the support portion (support pillar) 134 but the residual stress of the sensor second layer is absorbed by the deformation of the beam formed by the slit 133, it is possible to suppress the occurrence of the unevenness and the breakage due to the film internal stress of the sensor second layer. Since the width of the slit 133 is almost equal to the etching hole 132, the slit 133 is automatically sealed at the same time of sealing the etching hole 132.

Figure 14:
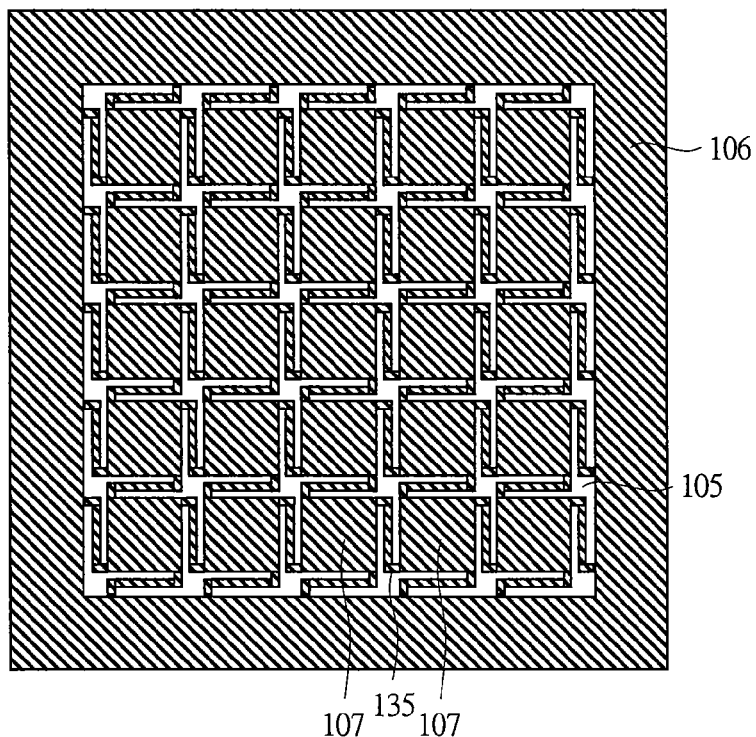
FIG. 14 is a plan view showing a modified example of the planar layout of the movable structure body in the inertial sensor according to the first embodiment.
Figure 15:
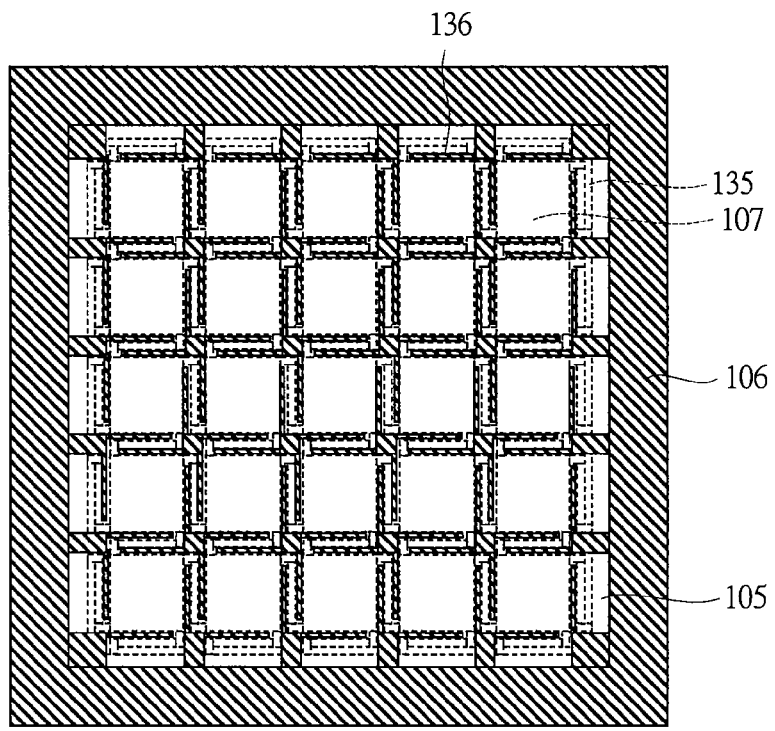
FIG. 15 is a plan view showing a modified example of the planar layout of the support portion arranged in the cavity portion in the inertial sensor according to the first embodiment.

In this case, the shape of the beam which supports the divided weight is designed so that its root portion in the cavity portion is sufficiently thick and is hardly elastically deformed even if the acceleration is applied to the divided weight. On the other hand, the center portion of the beam is designed so that it has a narrower width in comparison with the root portion and a desired elastic deformation is caused by the application of a predetermined acceleration. Accordingly, the mechanical characteristic is determined only by the planar pattern shape and the film thickness of the sensor first layer, and it is not dependent on the dimensions and the shape of the cavity portion. More specifically, the dimensions and the shape of the cavity portion are determined on the basis of the etching accuracy of the so-called sacrifice layer, and its accuracy is low. However, it does not affect the mechanical characteristic of the inertial sensor according to the first embodiment. The planar shape of the beam is not limited to the shape in FIG. 1. For example, it is also possible to employ a shape of a beam 135 shown in FIG. 14. In this case, for example, a support portion (support pillar) 136 which supports the cavity portion 105 can be disposed as shown in FIG. 15. In other words, the support portion 136 can be disposed between the beam 135 and the divided weight 107. The layout of the support portion (support pillar) 136 can be changed on the basis of the layout of the etching hole provided in the sensor second layer.

Further, as shown in FIG. 11C, the uppermost (fourth) wiring layer pattern provided in the whole surface below the cavity portion 105 functions as an electric shield between the inertial sensor and the LSI formed below the uppermost wiring layer. In the case where the LSI (circuit) is not arranged below the layout region of the inertial sensor, the function of the electric shield is not always necessary. In the etching at a time of forming the cavity portion 105, for example, the semiconductor substrate (silicon substrate) 100 itself can be used as the etching stopper. The sensor second layer also functions as a shield for electrically and magnetically protecting the sensor from the external field by earthing connection.

Second Embodiment

Figure 16:
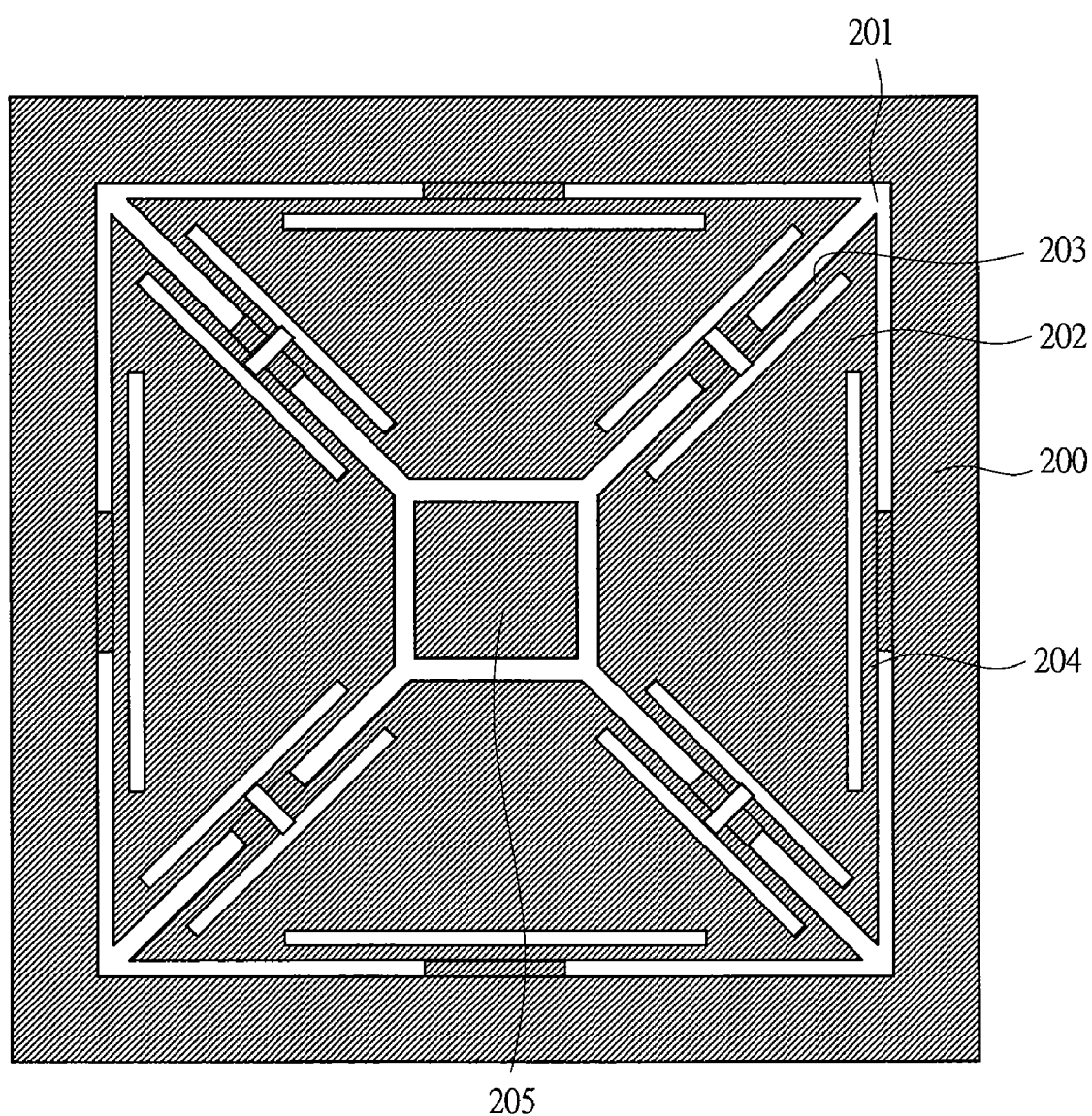
FIG. 16 is a plan view showing a planar layout of a movable structure body in an inertial sensor according to a second embodiment.

A one-axis acceleration (or vibration) sensor (inertial sensor) according to a second embodiment of the present invention will be described with reference to the accompanying drawings. FIG. 16 is a diagram schematically showing a planar layout of a movable structure body (sensor first layer) of the one-axis acceleration (or vibration) sensor in the second embodiment. FIG. 17 is a schematic cross sectional view for explaining an operation of the one-axis acceleration sensor in the second embodiment. The one-axis acceleration sensor in the second embodiment is also manufactured by the same manufacturing process as the first embodiment mentioned above.

A divided weights 202 formed in the sensor first layer are formed to have four trapezoidal shapes as shown in FIG. 16. The divided weight 202 is formed inside a cavity portion 201, and the divided weights 202 are connected to each other by beams 203. Each of the divided weights 202 is fixed to a frame 200 of the cavity portion 201 via a beam 204 formed by the sensor first layer. Accordingly, each of the divided weights 202 is suspended inside the cavity portion 201 by the beam 203 and the beam 204. A support portion 205 is provided in a center portion of the cavity portion 201. In this case, a fixed lower electrode 206 is formed in a lower portion of the cavity portion 201, and a fixed upper electrode 207 is provided in an upper portion of the cavity portion 201. In the one-axis acceleration sensor in the second embodiment, an example in which the upper electrode 207 and the lower electrode 206 are formed has been shown. However, other structure is possible as long as either one of them is provided. The capacitor element Ca is formed by the lower electrode 206 and the divided weight 202, and the capacitor element Cb is formed by the upper electrode 207 and the divided weight 202.

Figure 17A:
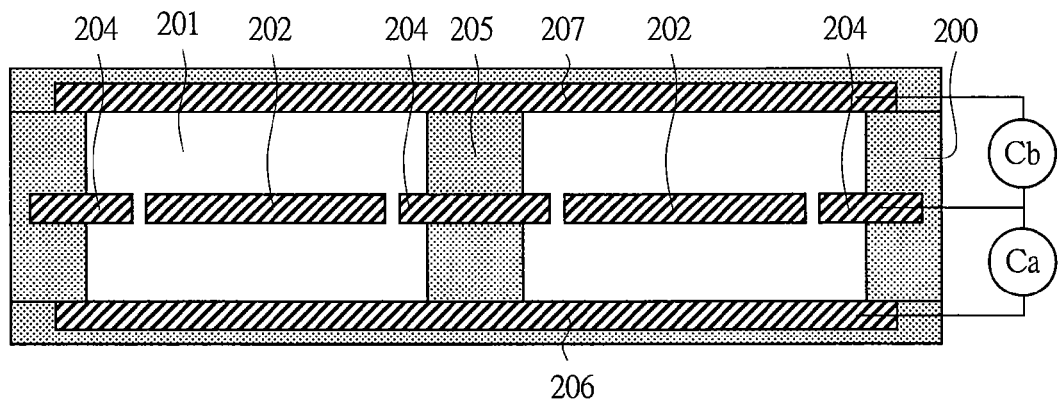
FIG. 17A is a schematic cross sectional view for explaining an operation of the inertial sensor according to the second embodiment.

Next, an operation of the one-axis acceleration sensor according to the second embodiment will be described. FIG. 17A is a cross sectional view of the one-axis acceleration sensor in the case where the acceleration is not applied. FIG. 17 shows only the cavity portion 201 and the sensor first layer for simplification. The divided weight 202 and the beam 204 are formed in the sensor first layer, and the divided weight 202 is suspended in the cavity portion 201 by the beam 204.

Figure 17B:
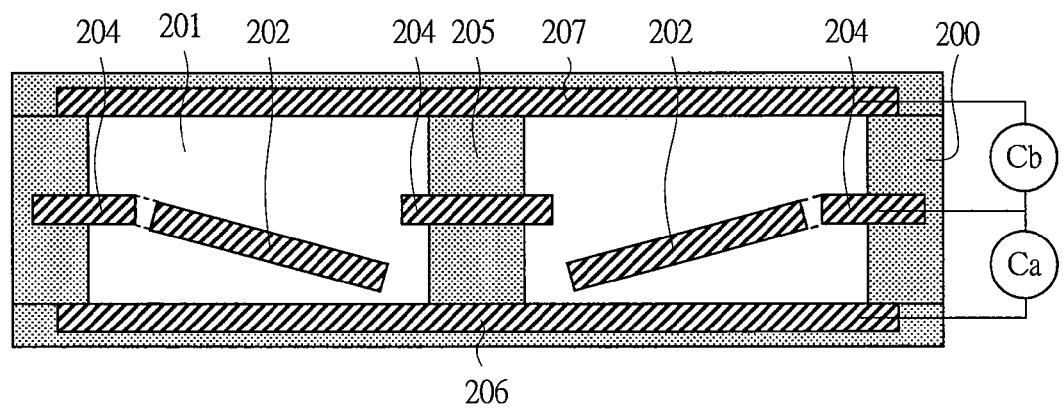
FIG. 17B is a schematic cross sectional view for explaining an operation of the inertial sensor according to the second embodiment.

If the acceleration is applied in an upward direction of the paper surface, each of the divided weights 202 is inclined as shown in FIG. 17B. This is caused mainly by the torsion of the beam 204. In other words, each of the divided weights 202 displaces by the torsion (torsional mode) of the beam 204 when the acceleration is small. By detecting a capacitance change between the sensor first layer (divided weight 202) and the lower electrode 206 due to the displacement by the capacitor element Ca and detecting the capacitance change between the sensor first layer (divided weight 202) and the upper electrode 207 by the capacitor element Cb, an acceleration signal is obtained. A minute torsion is generated in the divided weight 202 and the beam 204 due to the comparatively small acceleration, and the resulting minute angle change of the divided weight 202 achieves the large capacitance change.

Figure 17C:
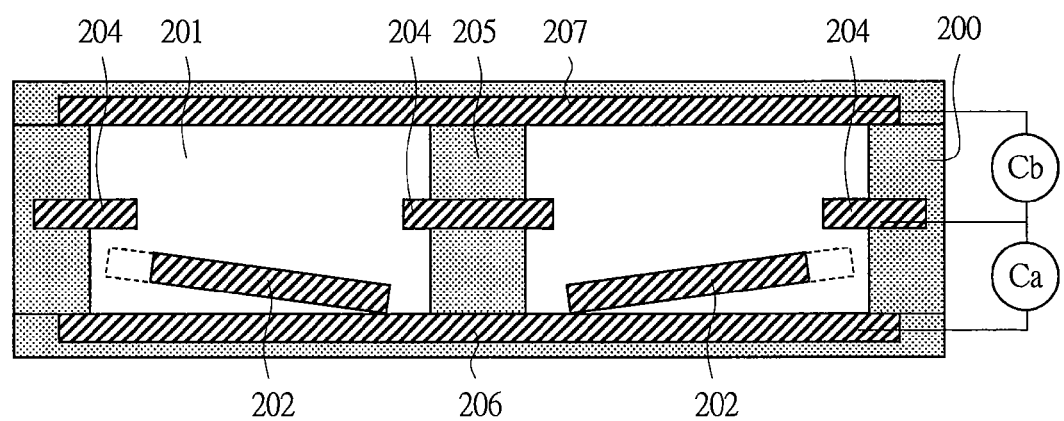
FIG. 17C is a schematic cross sectional view for explaining an operation of the inertial sensor according to the second embodiment.

If the acceleration is further increased, as shown in FIG. 17C, one side close to the center side of each of the divided weights 202 comes into contact with the bottom of the cavity portion 201, and a whole of the divided weight 202 displaces downward due to a bending deformation (bending mode) of the beam 204 which connects the frame 200 surrounding the cavity portion 201 and the divided weight 202. Since the spring rigidity of the bending deformation is high, a large acceleration is necessary for displacing the whole of the divided weight 202 downward. In other words, the displacement of the divided weight 202 due to the bending deformation appears in the large acceleration region. More specifically, the displacement due to the torsional mode mainly occurs in the small acceleration region, and the displacement due to the bending mode mainly occurs in the large acceleration region in which the displacement due to the torsional mode is saturated.

Although not shown in the drawing, the surface of the divided weight 202 functioning as the movable electrode is coated with an insulating film, by which the electrodes do not short even if the divided weight 202 comes into contact with the lower electrode 206 (or the upper electrode 207).

Figure 18:
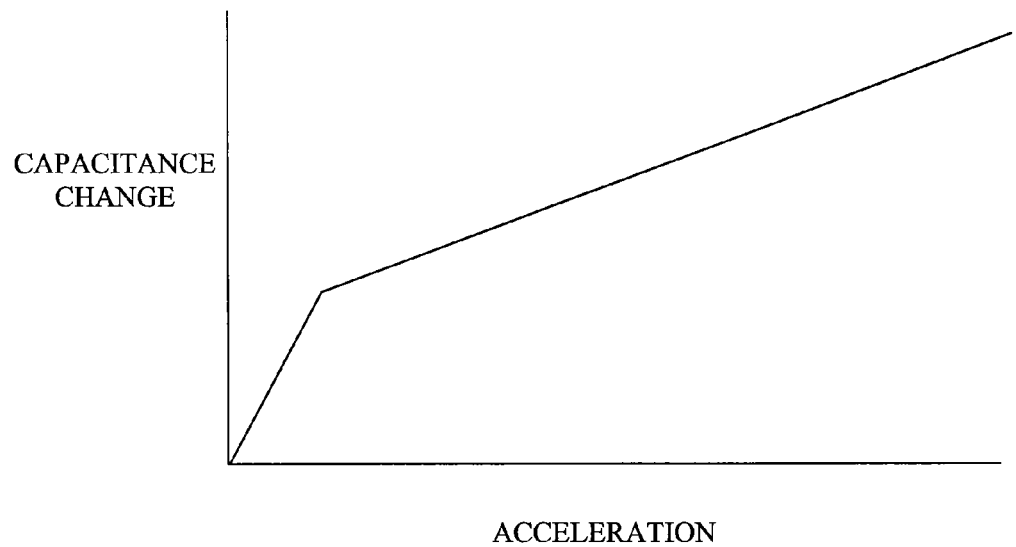
FIG. 18 is a graph showing a relation between acceleration and capacitance change in the inertial sensor according to the second embodiment.

FIG. 18 shows an acceleration-capacitance change characteristic of the one-axis acceleration sensor according to the second embodiment. In FIG. 18, a horizontal axis represents a magnitude of the applied acceleration and a vertical axis represents a capacitance change between the divided weight 202 and the lower electrode 206 (or the divided weight 202 and the upper electrode 207). As shown in FIG. 18, it can be understood that the capacitance change is large and the sensitivity is high in the range of the small acceleration, and the capacitance change is generated over the wide range of the acceleration. This can be interrupted as follows. That is, in the range where the acceleration is small, the divided weight 202 displaces due to the torsion of the divided weight 202 and the beam 204 and the capacitance change is generated. The displacement due to the torsion of the divided weight 202 and the beam 204 is sensitive to the acceleration, and the large capacitance change is generated. Then, if the magnitude of the acceleration becomes large, the displacement due to the torsional mode is saturated, but the bending deformation having the high rigidity is subsequently generated by the acceleration. Since the spring rigidity of the bending deformation is high, a large acceleration is necessary for displacing the whole of the divided weight 202 downward. Therefore, it is possible to displace over the wide range of the acceleration. It can be understood that the high sensitivity is achieved in the low acceleration region until one side of each of the divided weights 202 comes into contact with the bottom of the cavity portion 201, and the sensitivity of a certain level or more can be achieved over the wide acceleration region as mentioned above.

Figure 19:
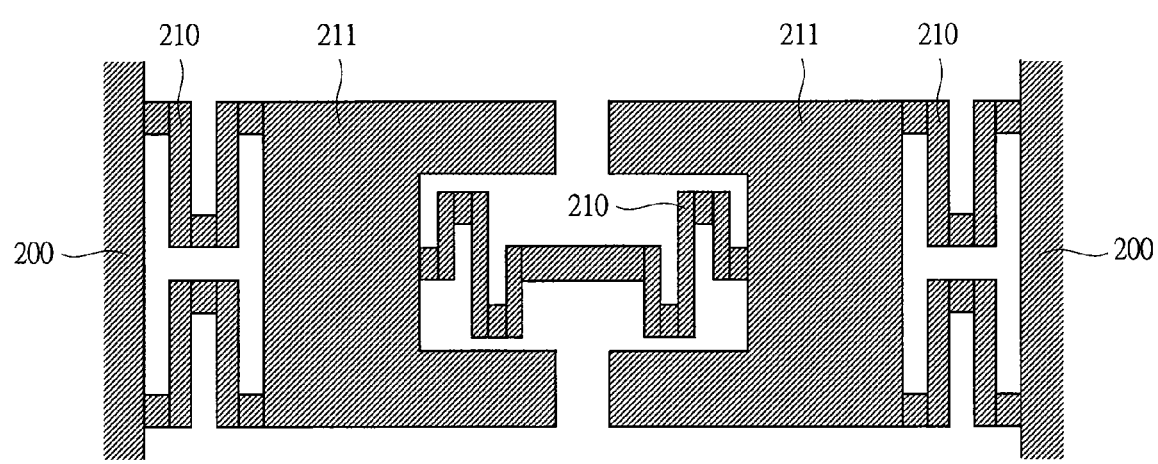
FIG. 19 is a plan view showing a modified example of the planar layout of the movable structure in the inertial sensor according to the second embodiment.

The rigidity of the beam 203 connecting the rectangular divided weights 202 to each other can be set lower than the rigidity of the beam 204 fixed to the periphery (frame 200). Further, the structure of the divided weight 202 is not limited to that shown in FIG. 16, but various modifications can be made as shown in FIG. 19. As shown in FIG. 19, divided weights 211 are connected to the fixed frame 200 via beams 210, and each of the divided weights 211 is connected by the beam 210. At this time, the divided weight 211 is formed in a C shape. Also in the one-axis acceleration sensor configured as mentioned above, the same effects as those of the one-axis acceleration sensor according to the second embodiment can be obtained.

Figure 20:
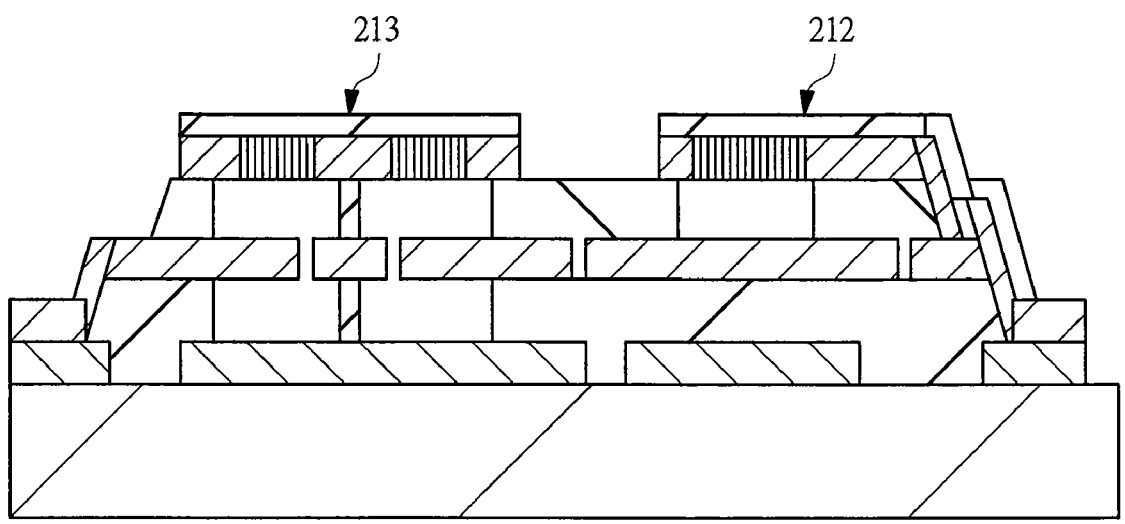
FIG. 20 is a cross sectional view showing a state in which the inertial sensor according to the second embodiment and a pressure sensor are formed on the same substrate.

An integrated sensor chip is manufactured by integrating the one-axis acceleration (or vibration) sensor according to the second embodiment with a pressure sensor and a signal processing LSI in the monolithic manner. FIG. 20 shows a cross sectional view schematically showing a sensor mechanism portion of the manufactured integrated sensor chip. In FIG. 20, a pressure sensor 212 has a sensor first layer functioning as a lower electrode and a sensor second layer functioning as an upper electrode, and a cavity is formed therebetween. In the pressure sensor 212, a pressure is measured by detecting a capacitance of a concavo-convex deformation of the sensor second layer including the upper electrode due to the external pressure. A one-axis acceleration sensor 213 is provided on the same semiconductor substrate as the pressure sensor 212. In the structure as mentioned above, a peripheral pressure can be detected by the pressure sensor 212, and the applied acceleration can be detected by the one-axis acceleration sensor 213.

The integrated sensor chip obtained by integrating the pressure sensor 212 and the one-axis acceleration sensor 213 can be applied to a tire pneumatic pressure monitoring system. In the tire pneumatic pressure monitoring system, a centrifugal force applied to the integrated sensor chip due to the rotation of the tire is detected by the one-axis acceleration (or vibration) sensor 213 according to the second embodiment. The integrated sensor chip recognizes that the vehicle is in a running state in the case where the centrifugal force is equal to or more than a predetermined threshold value, and it recognizes that the vehicle is in a substantially stop state in the other cases. An operation of the pressure sensor 212 is controlled depending on the running/stop state. More specifically, in the case where the vehicle is in a running state, a frequency of transmitting the measurement results of the pressure and the temperature by the pressure sensor 212 is increased, and in the case where the vehicle is in the other state, for example, in the stop state, the frequency of transmitting the results is suppressed to the minimum. By this means, it is possible to reduce an average power consumption of the integrated sensor chip. In the case where the running/stop state determined from the transmitting frequency detected on the vehicle side is inconsistent with the state determined by the other means (for example, a wheel speed sensor) on the vehicle side, there is a possibility that the integrated sensor chip is out of order. Therefore, an alarm is generated to a driver. In this manner, it is possible to apply the one-axis acceleration sensor 213 according to second embodiment to the tire pneumatic pressure monitoring system.

Third Embodiment

The present invention can be applied also to a sensor which detects an acceleration in a direction parallel to a main surface of the semiconductor substrate. In the third embodiment, an example in which the present invention is applied to an acceleration sensor (inertial sensor) which detects an acceleration in a direction of an X axis will be described with reference to FIG. 21 and FIG. 22.

Figure 21:
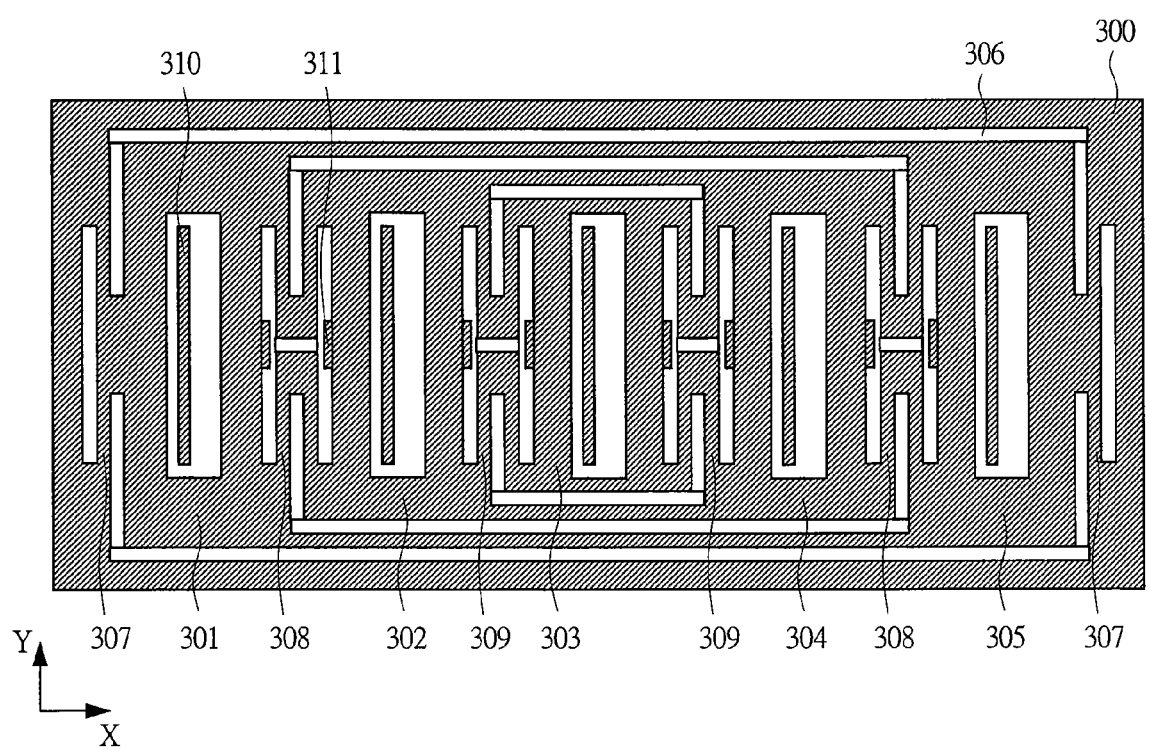
FIG. 21 is a plan view showing a planar layout of a movable structure body in an inertial sensor according to a third embodiment.

FIG. 21 is a schematic diagram showing a planar layout of a movable structure body in a one-axis acceleration sensor according to the third embodiment. FIG. 21 is a schematic diagram for explaining an operation of the one-axis acceleration sensor according to the third embodiment. The weights formed by a sensor first layer include five divided weights 301 to 305 arranged in the direction of the X axis as shown in FIG. 21. The divided weights 301 to 305 are connected to each other by beams, and the divided weight 301 and the divided weight 305 in both ends are fixed to a frame 300 surrounding a periphery of a cavity portion 306 via the beams formed by the same layer as the divided weights. The divided weight 301 and the divided weight 305 are connected by a beam 307 having a sufficient rigidity. The divided weight 301 and the divided weight 302 are connected by a beam 308, and the divided weight 304 and the divided weight 305 are also connected by the beam 308. Further, the divided weight 302 and the divided weight 303, and the divided weight 303 and the divided weight 304 are connected by a beam 309. A fixed electrode 310 is arranged in an inner portion of each of the divided weights 301 to 305. Also, a projection portion 311 is formed in each of the divided weights 301 to 305.

Figure 22A:
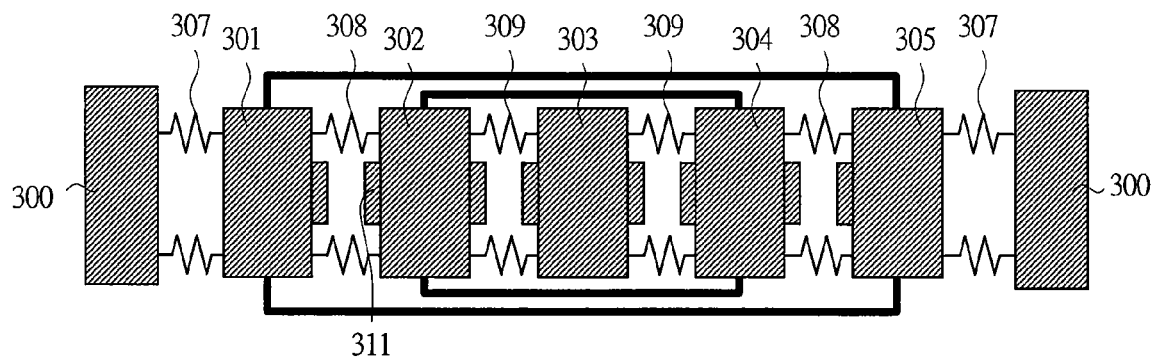
FIG. 22A is a schematic diagram for explaining an operation of the inertial sensor according to the third embodiment.

Next, an operation of the one-axis acceleration sensor according to the third embodiment will be described with reference to FIG. 22. Each of the divided weights 301 to 305 schematically shown in FIG. 22A displaces in the direction of the X axis when the acceleration is applied in the direction of the X axis, and the displacement is detected as a capacitance change between the fixed electrode 310 (not illustrated in FIG. 22 and refer to FIG. 21) fixed to the semiconductor substrate and each of the divided weights 301 to 305. The fixed electrode 310 is arranged in an inner portion of each of divided weights 301 to 305.

In this case, the rigidity of the beam 308 which connects the divided weight 301 and the divided weight 302 (or the divided weight 304 and the divided weight 305) is set higher than the rigidity of the beam 309 which connects the divided weight 302 and the divided weight 303 (or the divided weight 303 and the divided weight 304). The rigidity of the beam 307 which connects the frame 300 and the divided weight 301 or the frame 300 and the divided weight 305 is set higher than the rigidity of the beam 308 which connects the divided weight 301 and the divided weight 302 (or the divided weight 304 and the divided weight 305). More specifically, the divided weights arranged in an inner side are connected by the beams having the lower rigidity.

Figure 22B:
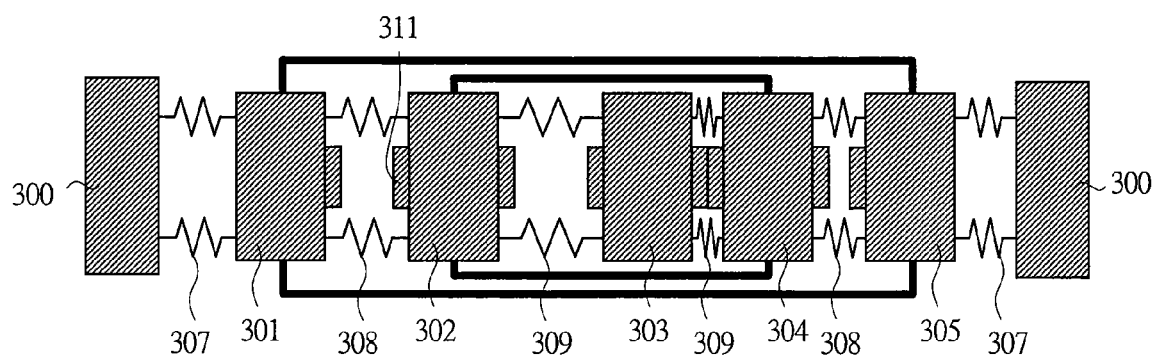
FIG. 22B is a schematic diagram for explaining an operation of the inertial sensor according to the third embodiment.
Figure 22C:
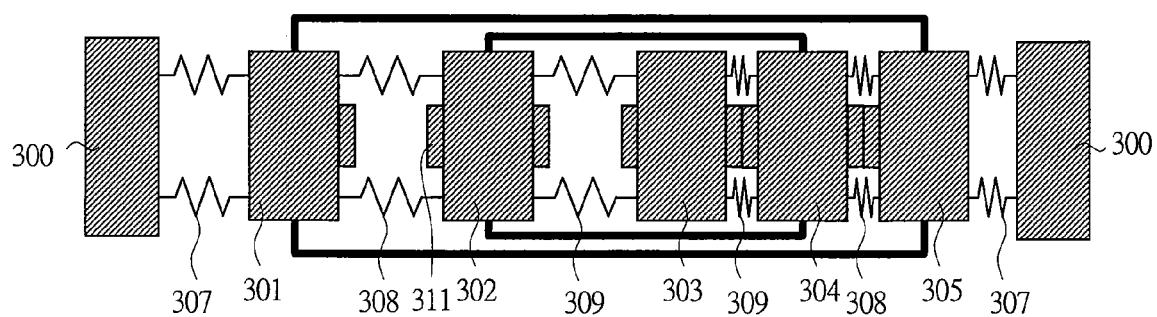
FIG. 22C is a schematic diagram for explaining an operation of the inertial sensor according to the third embodiment.

First, when the comparatively small acceleration is applied, the divided weight 303 connected by the beam 309 having the lowest rigidity displaces in the direction of the X axis. Subsequently, when the acceleration is increased, the displacement of the divided weight 303 is increased, and the divided weight 303 comes into contact with the divided weight 304 as shown in FIG. 22B. As a result, the divided weight 302, the divided weight 303 and the divided weight 304 function as an integrated member. Then, when the acceleration is further increased, the divided weight 304 comes into contact with the divided weight 305 as shown in FIG. 22C, and all the divided weights 301 to 305 function as an integrated member. In this manner, the high sensitivity can be obtained over the wide acceleration region. The divided weights 301 to 305 come into contact with each other by planar projection portions (stoppers) 311 provided in each of the divided weights 301 to 305 (root portion of the beam).

As described above, the acceleration is detected by the displacement of the divided weight 303 when the acceleration is comparatively small, and when the acceleration is increased and the displacement of the divided weight 303 is saturated, the divided weights 302 to 304 displace integrally. Accordingly, it is possible to detect the large acceleration. When the acceleration is further increased, the divided weights 301 to 305 displace integrally. As described above, since the masses of the weights to be displaced can be changed in accordance with the acceleration region, it is possible to obtain the high sensitivity to the wide acceleration region. In other words, it is possible to secure the detecting sensitivity of the acceleration and the wide dynamic range.

Figure 23:
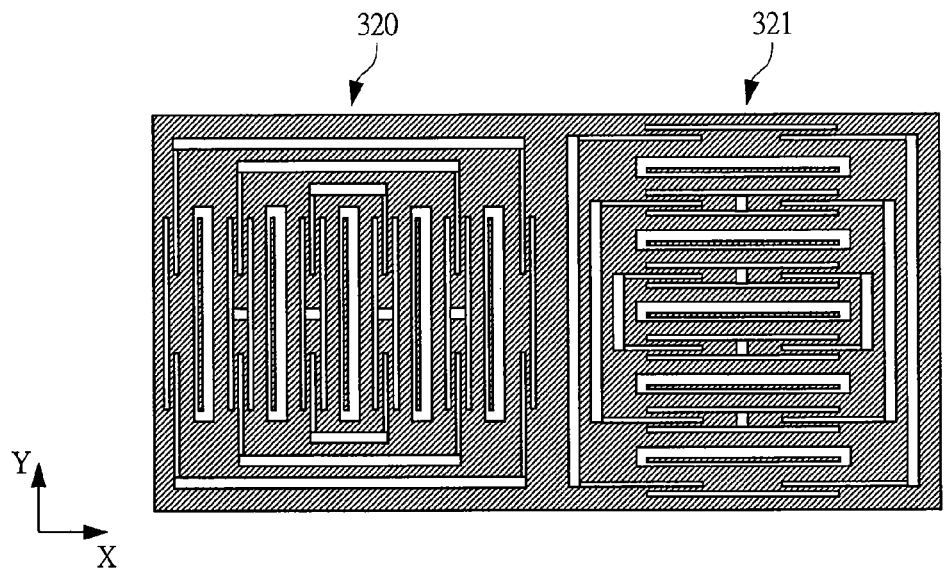
FIG. 23 is a plan view showing a modified example of the planar layout of the movable structure body in the inertial sensor according to the third embodiment.

As shown in FIG. 23, a two-axis acceleration sensor can be configured by arranging a one-axis acceleration sensor and another one-axis acceleration sensor rotated by 90 degrees in the same substrate. In other words, the two-axis acceleration sensor can be formed by forming the acceleration sensor 320 and the acceleration sensor 321 in the same substrate. At this time, the acceleration sensor 320 detects the acceleration in the direction of the X axis, and the acceleration sensor 321 detects the acceleration in the direction of the Y axis.

Figure 24:
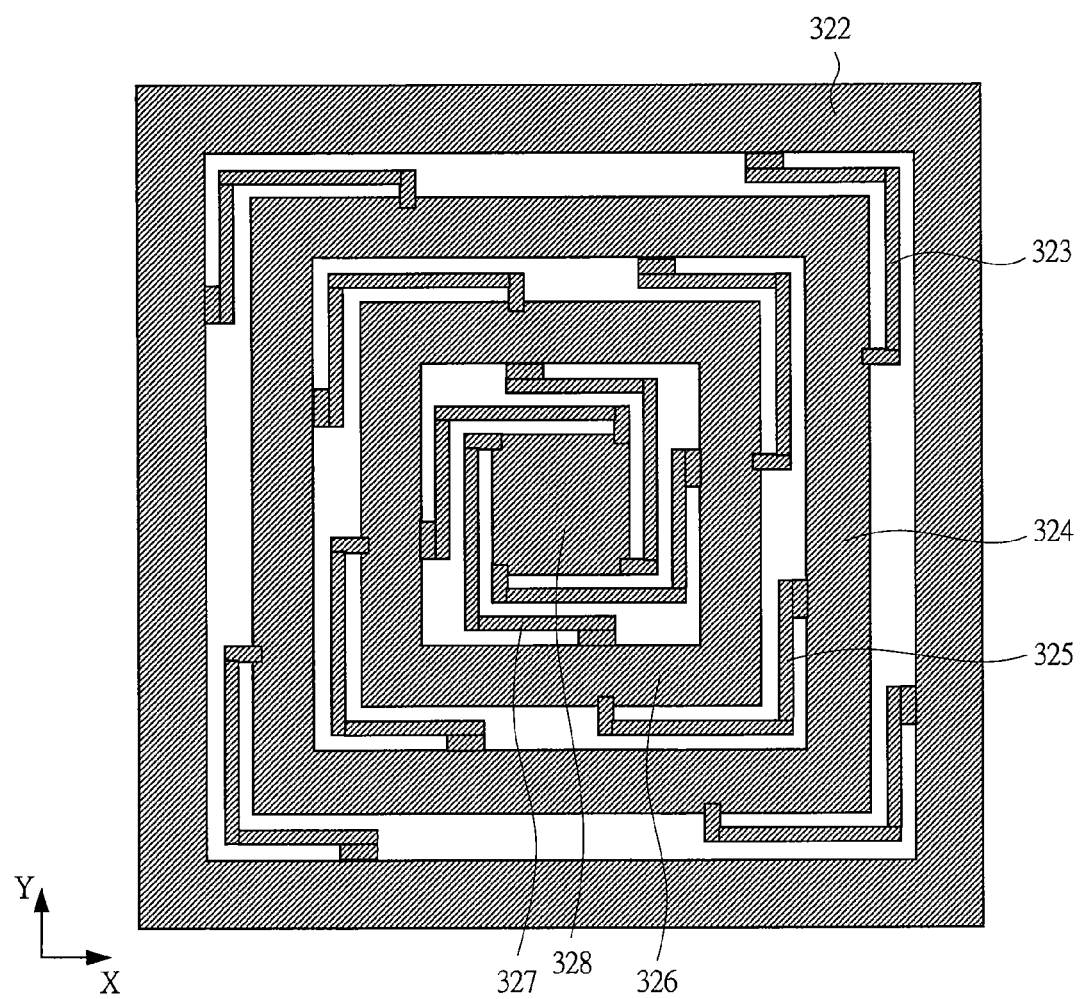
FIG. 24 is a plan view showing a modified example of the planar layout of the movable structure body in the inertial sensor according to the third embodiment.

Further, the two-axis acceleration sensor may be structured by a nested layout as shown in FIG. 24 or the same layout as FIG. 1 in the first embodiment mentioned above. For example, in the structure shown in FIG. 24, a frame-shaped divided weight 324 is connected via beams 323 in a cavity portion formed inside a frame 322 so as to freely displace in the directions of the X axis and the Y axis. Further, a frame-shaped divided weight 326 is formed inside the frame-shaped divided weight 324 via beams 325, and a square divided weight 328 is connected via beams 327 inside the divided weight 326. Each of the divided weights 324, 326 and 328 is designed so as to freely displace in the directions of the X axis and the Y axis. In this case, since the divided weight can be shared in both the directions of the X axis and the Y axis, the area utilization efficiency can be improved. However, when the inner divided weight displaces in the specific direction and it comes into contact with the outer divided weight, the divided weight is fixed also in the direction vertical to the specific direction. Therefore, it is preferable to form the structure capable of preventing the contact even in the case where the large acceleration is applied. Further, in the one-axis acceleration sensor or the two-axis acceleration sensor, a two-axis acceleration sensor or a three-axis acceleration sensor can be configured by simultaneously detecting the capacitance changes from the upper and lower electrodes.

Further, the one-axis acceleration sensor may have the structure as shown in FIG. 25A. In the structure in FIG. 25A, two divided weights 332 and 336 are connected via a beam 338, and they are fixed to frames (or substrates) 330 and 334 via beams 331 and 335. The divided weight 332 and the divided weight 336 have a frame shape, and a fixed electrode 333 and a fixed electrode 337 are formed therein.

An operation of the one-axis acceleration sensor configured as mentioned above will be described. In a small acceleration region, a deformation of a bending mode is generated as shown in FIG. 25B. Further, when the acceleration is further increased, the deformation of the bending mode is saturated, and a deformation in FIG. 25C is generated due to an expansion and contraction of the beams 331 and 335. Both the deformations are detected by the capacitance change between the fixed electrodes 333 and 337 fixed to the substrate and the divided weights 332 and 336. Also in the one-axis acceleration sensor having the structure mentioned above, by utilizing a plurality of deformation modes having the different sensitivity regions with respect to the acceleration, both the high sensitivity in the low acceleration region and the wide detecting range up to the large acceleration region can be achieved.

In the present invention, with regard to the portion relating to the structures of the weight and the beam of the inertial sensor, the manufacturing process is not particularly limited. In this case, the acceleration sensor according to the third embodiment can be manufactured by the same manufacturing process as the first embodiment mentioned above. However, for example, the movable structure body constituted by the divided weight and the beam can be manufactured through various types of micro-structure manufacturing method such as the process using a polysilicon film, an active layer of the SOI substrate and others.

In the foregoing, the invention made by the inventors of the present invention has been concretely described based on the embodiments. However, it is needless to say that the present invention is not limited to the foregoing embodiments and various modifications and alterations can be made within the scope of the present invention.

An applicable field of the inertial sensor according to the present invention covers extremely a lot of grounds such as a motor vehicle, a potable device, an amusement device, a wireless device, an information appliance, a computer and the like.

What is claimed is:

1. An inertial sensor comprising:
    a cavity portion formed on a substrate;
    a weight suspended in the cavity portion via elastically deformable elastic bodies; and
    a fixed electrode provided in the cavity portion,
    wherein a position change of the weight due to an acceleration is detected on the basis of a change of an electrostatic capacitance between the weight and the fixed electrode,
    the weight is divided into a plurality of divided weights, and
    each of the plurality of divided weights is directly connected to an adjacent divided weight by an elastically deformable elastic body such that a portion of a translational component of motion of each divided weight caused by the acceleration is transmitted to the adjacent divided weight.

2. The inertial sensor according to claim 1, further comprising:
    a lid which seals the cavity portion; and
    a support portion which supports the lid and is provided inside the cavity portion,
    wherein the support portion is formed among the plurality of divided weights.

3. The inertial sensor according to claim 1,
    wherein masses of the plurality of divided weights are equal to each other, and rigidities of the elastic bodies which connect the plurality of divided weights are also equal to each other.

4. The inertial sensor according to claim 1,
    wherein masses of the plurality of divided weights are different from each other, and rigidities of the elastic bodies which connect the plurality of divided weights are also different from each other.

5. The inertial sensor according to claim 1,
    wherein there is a limit to a movable range of the plurality of divided weights.

6. The inertial sensor according to claim 1,
    wherein a movable structure body constituted by the plurality of divided weights and the elastic bodies which connect the plurality of divided weights has a plurality of deformation modes having different sensitivity regions to an acceleration.

7. The inertial sensor according to claim 1,
    wherein the plurality of divided weights are arranged on the substrate in a two-dimensional manner.

8. The inertial sensor according to claim 1,
    wherein the plurality of divided weights are arranged on the substrate in a one-dimensional manner.

9. The inertial sensor according to claim 1, wherein an insulating material is provided between at least a portion of the weight and the fixed electrode.

10. The inertial sensor according to claim 1, wherein each divided weight is connected so as to allow both a translational component and a rotational component of motion in response to the acceleration.

11. The inertial sensor according to claim 1, wherein the entirety of the weight moves toward or away from the fixed electrode in response to the acceleration.

12. The inertial sensor according to claim 1, wherein at least two of the plurality of divided weights, which are directly connected to each other, are supported only by respective connections to adjacent divided weights through elastically deformable elastic bodies.

13. An inertial sensor comprising:
    a common fixed electrode; and
    an inertial mass portion including a plurality of weights supported in a spaced relationship from the common fixed electrode, each weight being directly connected to an adjacent one of the plurality of weights by an elastically deformable elastic body,
    wherein a position change of the inertial mass portion due to an acceleration is detected by a change in an electrostatic capacitance between the inertial mass portion and the common fixed electrode, and
    each weight is supported so as to allow both a translational component and a rotational component of motion of that weight in response to the acceleration.

14. The inertial sensor according to claim 13, further comprising a cavity portion, the plurality of weights being suspended in the cavity portion.

15. The inertial sensor according to claim 14, further comprising a support provided inside the cavity portion and disposed so as to support a lid that seals the cavity portion.

16. The inertial sensor according to claim 14, wherein the plurality of weights are arranged as a two-dimensional array, and the inertial mass portion is supported in the cavity portion only by elastically deformable elastic bodies directly connecting weights at edges of the two-dimensional array to edges of the cavity portion.

17. The inertial sensor according to claim 14, wherein the plurality of weights are arranged as a one-dimensional array, and the inertial mass portion is supported in the cavity portion only by elastically deformable elastic bodies directly connecting weights at each end of the one-dimensional array to edges of the cavity portion.

18. The inertial sensor according to claim 13, wherein at least two of the plurality of weights, which are directly connected to each other, are supported only by respective connections to adjacent weights by elastically deformable elastic bodies.

* * * * *